(12) United States Patent
Benedetto et al.

(10) Patent No.: US 11,721,305 B2
(45) Date of Patent: *Aug. 8, 2023

(54) CHALLENGE GAME SYSTEM

(71) Applicant: Sony Interactive Entertainment LLC, San Mateo, CA (US)

(72) Inventors: Warren Benedetto, Foothill Ranch, CA (US); Landon Noss, San Mateo, CA (US); Andrew Herman, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,300

(22) Filed: May 25, 2021

(65) Prior Publication Data

US 2021/0350768 A1 Nov. 11, 2021

Related U.S. Application Data

(63) Continuation of application No. 16/788,016, filed on Feb. 11, 2020, now Pat. No. 11,017,744, which is a continuation of application No. 15/994,579, filed on May 31, 2018, now Pat. No. 10,559,281.

(51) Int. Cl.
| | |
|---|---|
| A63F 13/497 | (2014.01) |
| A63F 13/86 | (2014.01) |
| G09G 5/14 | (2006.01) |
| A63F 13/30 | (2014.01) |
| A63F 13/52 | (2014.01) |
| H04N 13/351 | (2018.01) |

(52) U.S. Cl.
CPC ............... *G09G 5/14* (2013.01); *A63F 13/30* (2014.09); *A63F 13/497* (2014.09); *A63F 13/52* (2014.09); *A63F 13/86* (2014.09); *H04N 13/351* (2018.05)

(58) Field of Classification Search
CPC .............................. A63F 13/86; A63F 13/497
See application file for complete search history.

(56) References Cited

U.S. PATENT DOCUMENTS

2007/0117635 A1* 5/2007 Spanton ................. A63F 13/12
463/43

* cited by examiner

*Primary Examiner* — Jay Trent Liddle
(74) *Attorney, Agent, or Firm* — Penilla IP, APC

(57) ABSTRACT

Methods and systems are provided for enabling the creation, game play, and third party view of a head-to-head challenge game played synchronously or asynchronously by a first and second player. In one embodiment, a method includes operations for receiving a request to view the challenge game for obtaining a first and second video associated with a predefined segment of a single player game as played by the first and second player. The method further includes operations for executing the challenge game that plays the first video alongside the second video in a spectator interface, for accessing and processing telemetry data of the game play of the predefined segment to generate modified game play metrics, and for replacing game states that were produced when the predefined segment of the game was played with the modified game play metrics. The modified game play metrics are rendered to the spectator interface.

15 Claims, 14 Drawing Sheets

Synchronous Challenge Game, Live View

Asynchronous Challenge Game, Live View

Synchronous or Asynchronous Challenge Game, Non-Live View

CHALLENGE GAME SYSTEM

CLAIM OF PRIORITY

This application is a Continuation of U.S. patent application Ser. No. 16/788,016, filed on Feb. 11, 2020 (U.S. Pat. No. 11,017,744, issued on May 25, 2021), entitled "CHALLENGE GAME SYSTEM," which is a further Continuation of U.S. patent application Ser. No. 15/994,579, filed on May 31, 2018 (U.S. Pat. No. 10,559,281, issued on Feb. 11, 2020), entitled "CHALLENGE GAME SYSTEM," which is herein incorporated by reference.

FIELD OF THE DISCLOSURE

The present disclosure relates generally to video game challenges, and more particularly, to methods and systems for enabling synchronous and asynchronous head-to-head competition in single-player games for view by spectators.

BACKGROUND

Single-player video games and video games that have a single-player mode represent a large portion of the video game market. Single-player games are fun to play, but can be less competitive than their multiplayer counterparts. Additionally, single player games have less of a social component, which may be a desired feature for many video game players and spectators. Moreover, as electronic sports, or esports, are becoming an increasingly popular form of gaming, competition, and entertainment, current instantiations of single-player games are less amenable to being implemented in esports as their multiplayer counterparts.

Currently, for example, single-player games and video games with a single-player mode (hereinafter referred to collectively as single-player games) enable an individual player to make progress within a game, including completing missions, gaining experience, defeating enemies, leveling up, setting records for a number of incapacitations, and setting records for time-based challenges. However, it is difficult to compare one's progress with that of another in the spirit of competition. For example, a player of single-player game could share with their friend the number of points obtained or a personal record for completing a mission, and the friend could subsequently try to beat the player's number of points or personal record. However, much of the intensity and fun are lost in this disconnected and subdued form of competition. For example, the player will not know how the friend played the single-player game outside of the results. Moreover, this disconnected form of competition does not offer much in the way of spectator engagement, since it involves simply comparing a result (e.g., number of points or personal record) of a player with that of a friend. What is desired, therefore, is a technological platform that enables competition between players of single-player games that interested spectators can view as a head-to-head competition.

It is in this context that embodiments arise.

SUMMARY

Embodiments of the present disclosure relate to methods and systems for creating, playing, and enabling third party viewing of head-to-head challenge games. The head-to-head challenge games are contemplated to be based on segments of single-player video games or video games with single-player modes.

In one embodiment, a method for presenting a challenge game to a spectator is provided. The method includes an operation for receiving a request to view the challenge game between a first player and a second player for a game and for obtaining a first video associated with a predefined segment of the game from the first player and a second video associated with the predefined segment of the game from the second player. The method further includes an operation for executing the challenge game to play the first video alongside the second video in a spectator interface. The executing the challenge game, according to this embodiment, further includes operations for accessing a first telemetry data associated with the predefined segment of the game played by the first player and a second telemetry data associated with the predefined segment of the game played by the second player. The executing of the challenge game further includes operations of processing the first telemetry data and the second telemetry data for generating modified game play metrics and for replacing game states that were produced when the predefined segment of the game was played with the modified game play metrics to produce the first video and the second video, wherein the modified game play metrics are used to identify progress for the challenge game. Further, the method includes an operation for rendering, based on the modified game play metrics, a graphical element for displaying said progress for the challenge game and for providing the spectator interface for the request that includes the first video, the second video, and the graphical element for displaying said progress for the challenge game.

In another embodiment, a method for processing challenge games is provided. The method includes an operation for receiving data defining a challenge game, the challenge game being for a game title, the data defining the challenge game identifying a segment of the game title selected for the challenge game and the challenge game rules, the challenge game rules establishing optional modifications to native game rules for the game title. The method also provides an operation for providing access to the challenge game via an online game system, the challenge game being accessible for play by one or more users having access to the online game system, wherein game play of the challenge game occurs based on native game rules. Further, the method includes operations for storing game play of the challenge game from a first user and for storing game play of the challenge game from a second user. Additionally, the method includes an operation for presenting a spectator view of the challenge game between the first user and the second user, the spectator view presents an interface with a side-by-side video of the game play of the challenge game by the first and second users. According to this embodiment, the interface includes modified game play metrics based on the challenge game rules, the modified game play metrics being displayed in the interface in place of native game play metrics defined by the native game rules of the game title.

In one embodiment, the side-by-side video of the game play of the challenge game is synchronized to start and end at the same time, and play of the side-by-side video via the interface appears as if the first user and the second user are playing the challenge game in a live head-to-head session. In another embodiment, the game play of the challenge game by the first user is asynchronous with the game play of the challenge game by the second user. In another embodiment, the challenge game is one of a plurality of challenge games provided for access by the online game system, and the specific ones of the plurality of challenge games are viewable by users having a social connection or an invite to play the specific ones of the plurality of challenge games. In another embodiment, the challenge game is created by a user of the online game system or a curating entity such as a game publisher, a game developer, a game studio, or a third party entity that produces challenge games accessible by user of the online game system. In another embodiment, the interfaces provided for the spectator view enables interactive voting or wagering by the spectators while the side-by-side video of the game play is played as the challenge game progresses. In one embodiment, the modified game play metrics are produced while the side-by-side video of the game play plays as the challenge game progresses, the modified game play metrics are configured to reward or penalize the first or second user when violations of the challenge game rules are detected.

In another embodiment, a method for executing a challenge game to be played by two players is provided. The method includes an operation for executing a challenge game, the challenge game is defined by a game segment of a single-player game and a set of rules. In another operation, the method provides for processing game data associated with a first player and a second player playing the game segment that includes game play metrics and telemetry data. In a further operation, the method provides for generating game states for the challenge game based on said processing the game data and based on the set of rules for the first player and the second player playing the game segment, wherein the game states for the challenge game includes modified game play metrics. Further, the method includes an operation for rendering, based on the game states for the challenge game, a graphic for the challenge game, the graphic includes an indication of the modified game play metrics, as well as an operation for sending for display a spectator interface to a device for viewing the challenge game, wherein the spectator interface includes a first video and a second video of the first and second player playing the game segment, respectively, and the graphic.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
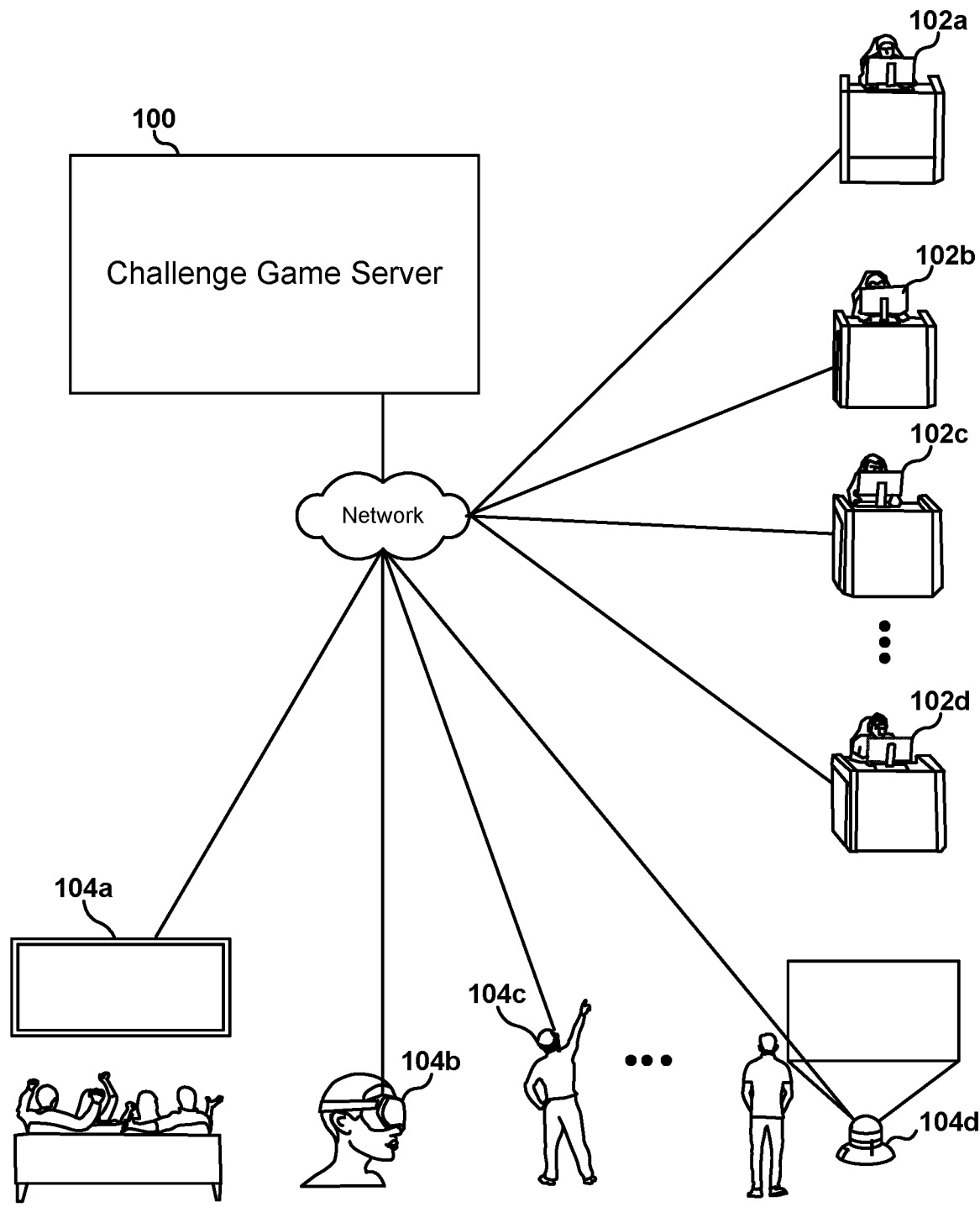
FIG. 1 shows a schematic diagram of a challenge game server and its connectivity with various participants, according to one embodiment.

The following embodiments describe methods, computer programs, and apparatuses for creating, playing, and for providing third party views of video game challenges. It will be obvious, however, to one skilled in the art, that the present disclosure may be practiced without some or all of these specific details. In other instances, well known process operations have not been described in detail in order to not unnecessarily obscure the present disclosure.

Single-player game or games with single-player modes represent a large portion of the video game market. Many single-player game are engaging and fun to play, but are lacking in a competitive aspect. For example, many players of single player games may wish to compare or benchmark their skills in the game against others. In other instances, many people in the video game space may wish to spectate head-to-head challenges between players of their favorite single player games. In still other instances, there is a demand to make certain games that are not particularly amenable to head-to-head competition into challenges that may be integrated into a competitive format but played in a familiar single-player format. This may be true of older "legacy" games that video game players have grown fond of over many years and that still have a considerable player base. There is an opportunity to create competitive (e.g., head-to-head) formats of game play from single-player games or single-player modes of games. There is also opportunity to enable the viewing public to watch their favorite players play against other players in a competitive format for single-player games. And as electronic sports (esports) continues to gain popularity, there is an opportunity to elevate single-player gaming action to the competitive stage set by esports.

Although much of esports is played synchronously, that is, that players play a game at the same time, certain embodiments contemplated here enable asynchronous play of challenges for esports. Asynchronous challenges may have players playing game segments at different times. However, when the challenge game is observed in the context of spectator viewing and esports, the asynchronous play is made to appear synchronous to a viewing audience.

Challenge games may be created by players or by the publisher of the video game in which the challenge game takes place. By creating a challenge game, a game segment or part of the video game is identified to be the challenge game. When the game segment is played, it is executed according to the game rules and parameters as would be present during normal execution of the video game. For example, any game play metrics associated with playing the game segment are calculated as they would be according to the rules and parameters of the video game.

The challenge game, however, may be defined with its own set of rules in the form of restrictions, limitations, and handicaps, referred to herein as challenge game rules. The challenge game rules are rules that do not necessarily alter the rules or parameters defined by the video game itself, but are applied and enforced during execution of the challenge game. For example, if one of the challenge game rules specifies that a penalty will be assessed for using magic, such a rule is not necessarily present in game segment itself, although the player may be aware of it. If the player subsequently uses magic, they may not experience the assessment of the penalty during their play of the game segment. As a result, the player's game play metrics will not be affected by the penalty. However, the penalty may be applied during execution of the challenge game. When the penalty is applied during execution of the challenge game, the player's game play metrics are modified and displayed to spectators in a spectator interface. In one embodiment, the player may not be aware of the penalty or the modified game play metrics until the challenge game is over. In some embodiments, the player may be aware that penalties or other new rules will be applied, but the application is done when a spectator views a side-by-side challenge.

For example, a player may get a score of 100 points under the native game rules, but when the game play is shown to a spectator in a challenge, that same game play will only get a score of 36 points. The player may or may not be aware of the modified rules under which the challenge is displayed, but the result is that both plays in the shown challenge will be modified or penalized or rewarded in accordance with the modified rules. As noted herein, it is also possible for each of the players to get their modified play results adjusted differently or the same, or weighted, or rate changed.

In other embodiments, challenge game rules may be programmed into the game segment itself such that challenge game rules are applied and enforced during game play of the game segment. As a result, the game play metrics associated with the player's game play may be modified on-the-fly within the game segment. For example, in these embodiments, the penalty may be applied during execution of the game segment and the player may become aware of such penalty while playing.

FIG. 1 shows a schematic diagram of a challenge game server 100 and its connectivity with various participants. For example, player devices 102a-102d are connected to the challenge game server 100 via a network, which could include the internet. Player devices 102a-102d may include any device capable of executing a game application. For example, player devices 102a-102d may include personal computers such as laptop and desktop computers, tablets, mobile phones, virtual reality devices such as head mounted displays (HMDs), game consoles, etc. In some embodiments, the player devices 102a-102d may include game consoles such as PlayStation® 4 and PlayStation® 3 consoles, as well as PlayStation® Vita, all manufactured by Sony® Corporation.

The player devices 102a-102d enable players associated with each of the player devices 102a-102d to interact with a video game for a challenge game session. In some embodiments, each player plays the video game separately (e.g., not in multiplayer mode) and therefore each of the player devices 102a-102d is associated with an instance of the video game that is independent of each of the other instances of the video game. In some embodiments, each instance of the video game may be may be executed primarily on the respective player devices 102a-102d. In various embodiments, the respective video game instances may be executed on the challenge game server 100. In various embodiments, the instances of the video games may be executed on a game server that is independent of the challenge game server 100. In various embodiments, the instances of the video game may be executed on a combination of the player devices 102a-102d, the challenge game server 100, and one or more game servers.

FIG. 1 also shows a plurality of spectator devices 104a-104d that communicate with the challenge game server 100, for example, via the Internet. The spectator devices 104a-104d enable respective spectators associated with the spectator devices 104a-104d to view the challenge game session as the challenge game session occurs, or at a later time. Spectator devices 104a-104d may include any device capable of displaying video content. For example, spectator devices 104a-104d may include any of the devices that that are usable as the player devices 102a-102d, including laptop computer, desktop computers, tablets, mobile phones, virtual reality devices such as HMDs, game consoles such as PlayStation® 3, PlayStation® 4, and portable consoles such as the PlayStation® Vita and others. In addition, spectator devices 102a-102d may also include televisions, smart assistants, and personal robots having display capabilities.

Figure 2:
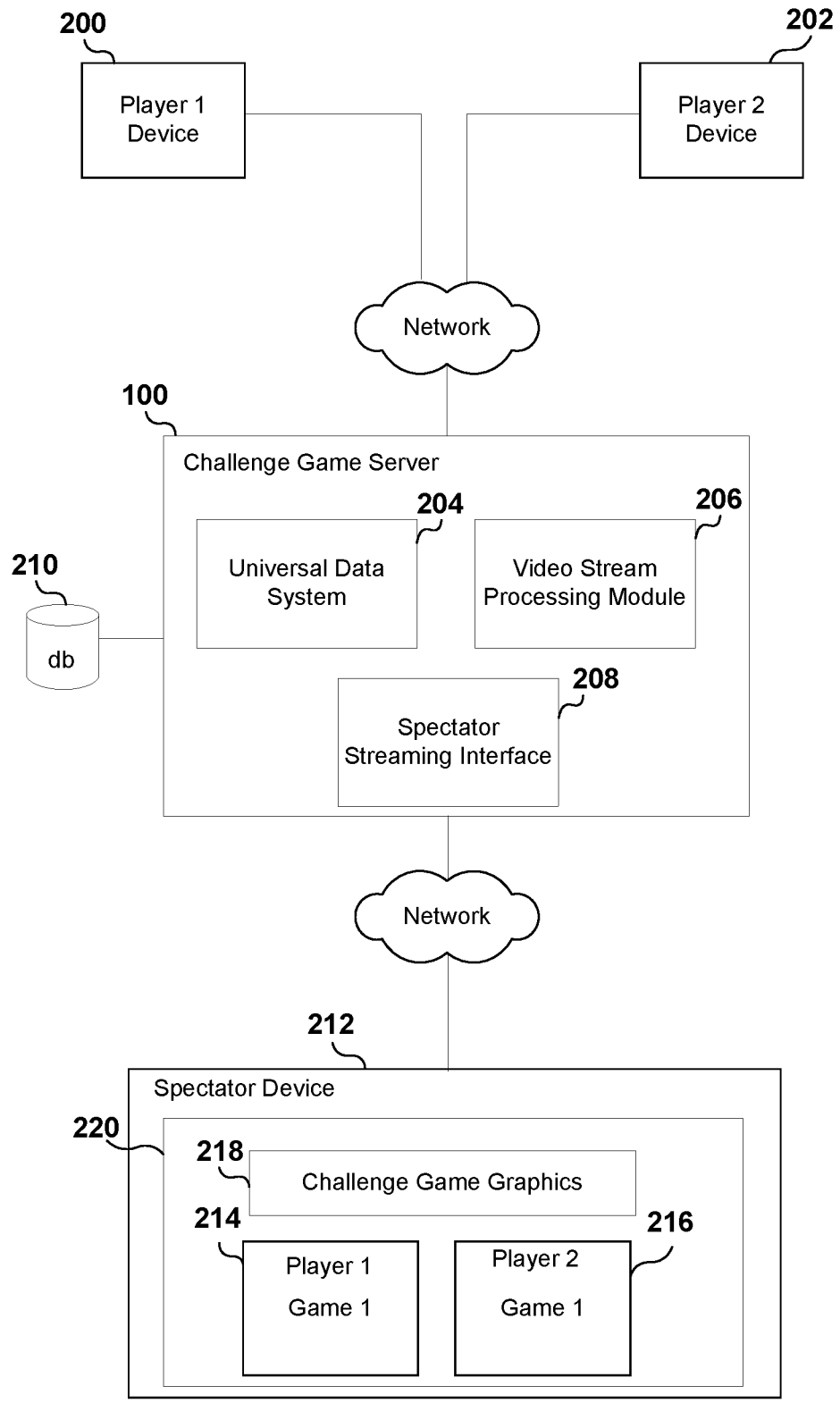
FIG. 2 is a conceptual diagram of a system for executing a challenge game by a challenge game server based on a first player's and a second player's playing of a common game segment, according to one embodiment.

FIG. 2 is a conceptual diagram of a system for executing a challenge game by a challenge game server 100 based on a first player's and a second player's playing of a common game segment. In some embodiments, the challenge game is associated with a predefined game segment of a single-player game that is playable. The challenge game may be executed on the challenge game server 100 while the game segment is executed on player devices 200 and 202 for a first and second player. In other embodiments, the game segment may be executed on the challenge game server 100 as a remote gaming service while the first and second players interact with the remote gaming service via player devices 200 and 202, respectively.

It is envisioned that the challenge game can be a meta-game in some sense, because players play the challenge game by playing the game segments. The execution of the challenge game will therefore depend upon the players playing the game segments. However, the challenge game will have game states and game play metrics that are based on but different from the game states and game play metrics of the individual game segments played by the players. More detail is provided with respect to how game segment data is used to generate challenge game data in FIGS. 3 and 4.

It is contemplated that a game segment for a given challenge game may be playable segment of a single-player game that is time-boxed and/or parameterized to control for certain variables while playing the segment of the single player game. The game segment, may, for example, be extracted from a single-player game and bounded by a start point and an end point as well as a time box.

As an example, assume the single-player game is a fantasy video game having various enemies such as dragons. The game segment may be extracted from the fantasy video game to include a roughly 2-minute segment of the fantasy video game that includes an objective or end point of defeating a dragon. The game segment may be parameterized for game variables such as game assets, the character to be played, the abilities and tools of the character, the health of the character, and so on. For example, the game segment of the fantasy game may be parameterized to define a set of game assets to include a suit of armor, the character to be a mage, the abilities and tools to include a bow and arrow, and the health of the character to be 800 health points.

In addition, the challenge game may also be specified with penalties for performing certain in-game actions within the game segment. For example, if there is a penalty specified for using magic and a player uses magic, the player may be penalized within the challenge game. In some embodiments, the penalty may be applied within the challenge game (e.g., applied during execution of the challenge game on the challenge game server), but not necessarily within the game segment (e.g., not applied during execution of the game segment on the player device). As a result, the player may not be apprised of the penalty while playing the challenge game segment, although the player may later find out via a challenge game results display. In other embodiments, penalties may be applied during execution of both the challenge game and the game segment.

In other embodiments, the challenge game may also be specified with limitations and handicaps. As compared to penalties for performing an in-game action, limitations are contemplated in some embodiments to prevent some game action from being performed by a player within the game segment. For example, the challenge game may be specified with a limitation that prevents summoning a guardian force ally that is capable of fighting the dragon within the game segment. When the player attempts to perform the game action of summoning a guardian force, the game segment may be defined to ignore that particular game action. Thus, limitations are contemplated to control for various modes of play that may render the challenge game less competitive. Moreover, limitations are contemplated to apply to both players.

Challenge games are also contemplated to be specified with handicaps that can make a challenge game more competitive by handicapping a first player but not a second player. As a result, if the first player is generally better than the second player at the fantasy video game, the first and second players may still compete at the challenge game on a more even playing field. Generally, a handicap is contemplated to apply to one of the two players, however different players may be handicapped in different ways. Many types of handicaps are contemplated to this end. Some handicaps reduce a player's health, energy, stamina, mana, armor, or shield. Some handicaps may be implemented by the challenge game execution logic at the challenge game server 100 and others may be implemented by the player devices 200 and 202 depending on the type of handicap.

According to various embodiments, the game segment is embodied as a saved data file and may be executed on the player devices 200 and 202 or elsewhere. In other embodiments, the game segment may be implemented according to configuration data or boot parameters that are processed by the game at start up to instruct the game execution logic as to how the start the game (e.g., what point to start at, which character to use, and what features or other parameters the character has).

In other embodiments, the game segment may be executed on the challenge game server 100 or on a remote gaming server (not shown). In some embodiments, the challenge game may be played synchronously by the first and second players. For example, both players may begin playing the game segment at the same or similar times for real time competition. In other embodiments, the challenge game server 100 also enables asynchronous competition for the challenge game. For example, the two players can play the game segment at different times. When the first player and the second player play the game segment at different times, they are processed at the same time for the challenge game such that the game segments appear as if they are being played live within a spectator interface 220 of the spectator device 212. For example, whether the game segments are played asynchronously, the video streams 214 and 216 of the played game segments are displayed synchronously, as are the challenge game graphics 218.

In the embodiment shown in FIG. 2, the challenge game server 100 includes a universal data system 204, a video stream processing module 206, and a spectator streaming interface module 208. The universal data system 204 processes, among other things, telemetry data as it is being generated by the first and second player devices 200 and 202, which is then used to generate modified game metrics or game states for the challenge game. The universal data system 204 is further able to determine the progress of the respective players in the challenge game based on the modified game metrics or game states for the challenge game. For example, in some embodiments, the telemetry data is indicative of how a player is doing in the game segment or how close the player is to completing the objective of the game segment.

The video stream processing module 206 obtains the respective video data of the first and second players for processing and delivery to the spectator streaming interface module 208. When one or both of the players have completed the game segment at some prior time, the video data and the game data may be retrieved from a database 210 that stores previously played game segments. In some embodiments, the video stream processing module 206 may perform compressing and/or scaling functions on the video data of the first and second players for the spectator streaming interface 208. Moreover, in these and other embodiments, the video stream processing module 206 may additionally overlay graphics on the video streams for the spectator streaming interface 208. The spectator streaming interface module 208 generates a spectator interface 220 for a spectator to view the challenge game as it is being executed in real time or near real time.

The spectator device 212 is shown to be in communication with the challenge game server 100 via a network such as the Internet. The spectator device 212 is shown to display the spectator interface 220 including the first video 214 associated with the first player, the second video 216 associated with the second player, and the challenge game graphics 218 associated with both players. As noted above, the challenge game server 100 serves the first and second videos 214 and 216 synchronously, even if the first and second players do not play the game segment synchronously.

As a result, when the challenge spectator interface 220 is initiated, both the first video 214 and the second video 216 are made to begin at the same time.

The challenge game graphics 218 are contemplated to include various indicators of progress of the first and second player with respect to the challenge game as it is being made in the respective game segments. For example, the challenge game graphics may include representations of the modified game play metrics for the players. As a result, the challenge game graphics may include a graphical or textual representation of progress, health, abilities, energy, points, score, penalties violated, proximity to enemies and points of interest, handicaps, restrictions, and other parameters for both player's game segments as processed for the challenge game.

Figure 3:
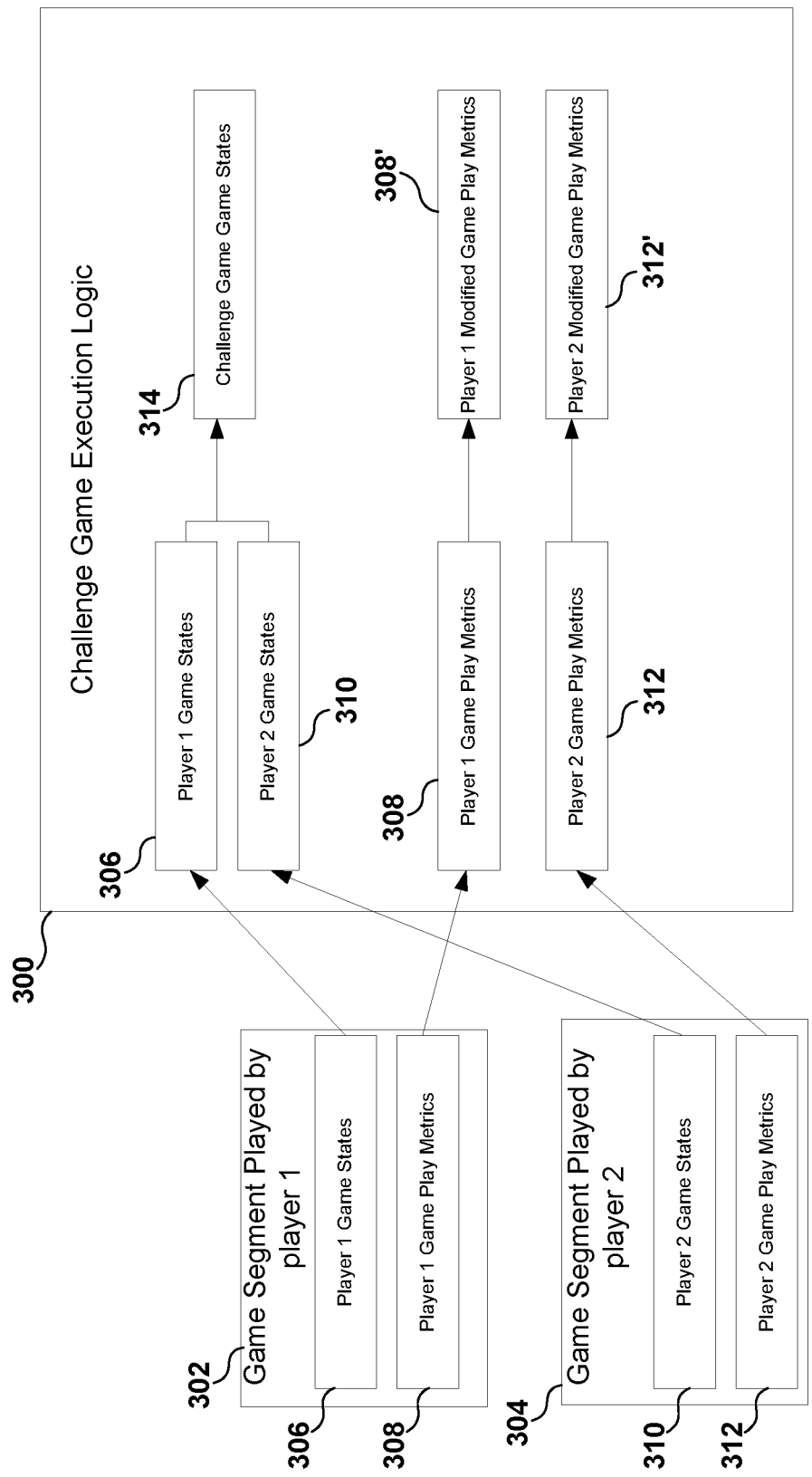
FIG. 3 shows a schematic diagram of certain relationships between game segments as played by a first and second player and the challenged game that is defined by the game segments, according to one embodiment.

FIG. 3 shows a schematic diagram of certain relationships between game segments as played by a first and second player and the challenged game that is defined by the game segments. For example, a game segment 302 as played by a first player and a game segment 304 as played by a second player are shown. When the game segment 302 is played by the first player, game states 306 and game play metrics 308 are shown to result. Likewise, when game segment 304 is played by a second player, game states 310 and game play metrics 312 are shown to result.

Game states 306 and 310 describe the state of the game segment as it is being played at any given point in time. The game states 306 and 310 are used by the challenge game execution logic 300 to generate the challenge game game states 314 in real time, which reflect the state of the challenge game at any given point in time depending on the game states 306 and 310 at the same corresponding time. For example, the challenge game game states 314 at a time of 2 minutes and 5 seconds will depend on both the game states 306 and 310 at a time of 2 minutes and 5 seconds. Further, the challenge game execution logic 300 is contemplated to generate the challenge game game states 314 based on challenge game rules that are applied to the game states 306 and 310. The challenge game execution logic 300 may compare, for example, the state at 2 minutes and 5 seconds of game states 306 to that of game state 310 to generate a challenge game game state at 2 minutes and 5 seconds according a set of challenge game rules that are defined by penalties, handicaps, etc.

Game play metrics 308 and 312 result from the first and second player playing the game segment and describe various metrics related to how a player is doing within the game segment. Game play metrics 308 and 312 may include data that a player would normally expect to see as it relates to the player's progress within a game. For example, the game play metrics 308 and 312 may include data related to a player's health, abilities, penalties violated, proximity to enemies and various points of interest, handicaps, restrictions or limitations, etc. The challenge game execution logic 300 is shown to generate modified game play metrics 308' from game play metrics 308 for the first player and to generated modified game play metric 312' from game play metrics 312.

The challenge game execution logic 300 is contemplated to generate the modified game play metrics 308' and 312' from game play metrics 308 and 312 based on the set of rules for the challenge game that is defined by penalties, handicaps, etc. Therefore, depending upon the particular challenge game and its rules, the game play metrics 308 and 312 that the players see as the player plays the game segment may be different from the modified game play metrics 308' and 312' that are displayed to spectators. For example, assume there is a penalty associated with the challenge game for using magic. The use of magic within the game segment is not restricted necessarily in this embodiment, but such use will cause a penalty to be assessed to the player who uses magic. According to this example, the penalty may scale the amount of damage the player takes from enemies by a factor of two for a period of 30 seconds. If the first player happens to use magic, the penalty and scaling of the amount of damage taken may be implemented by the challenge game execution logic 300 that results in a modified game play metric 308' reflecting a health that is different than the health reflected by game play metric 308.

Figure 4:
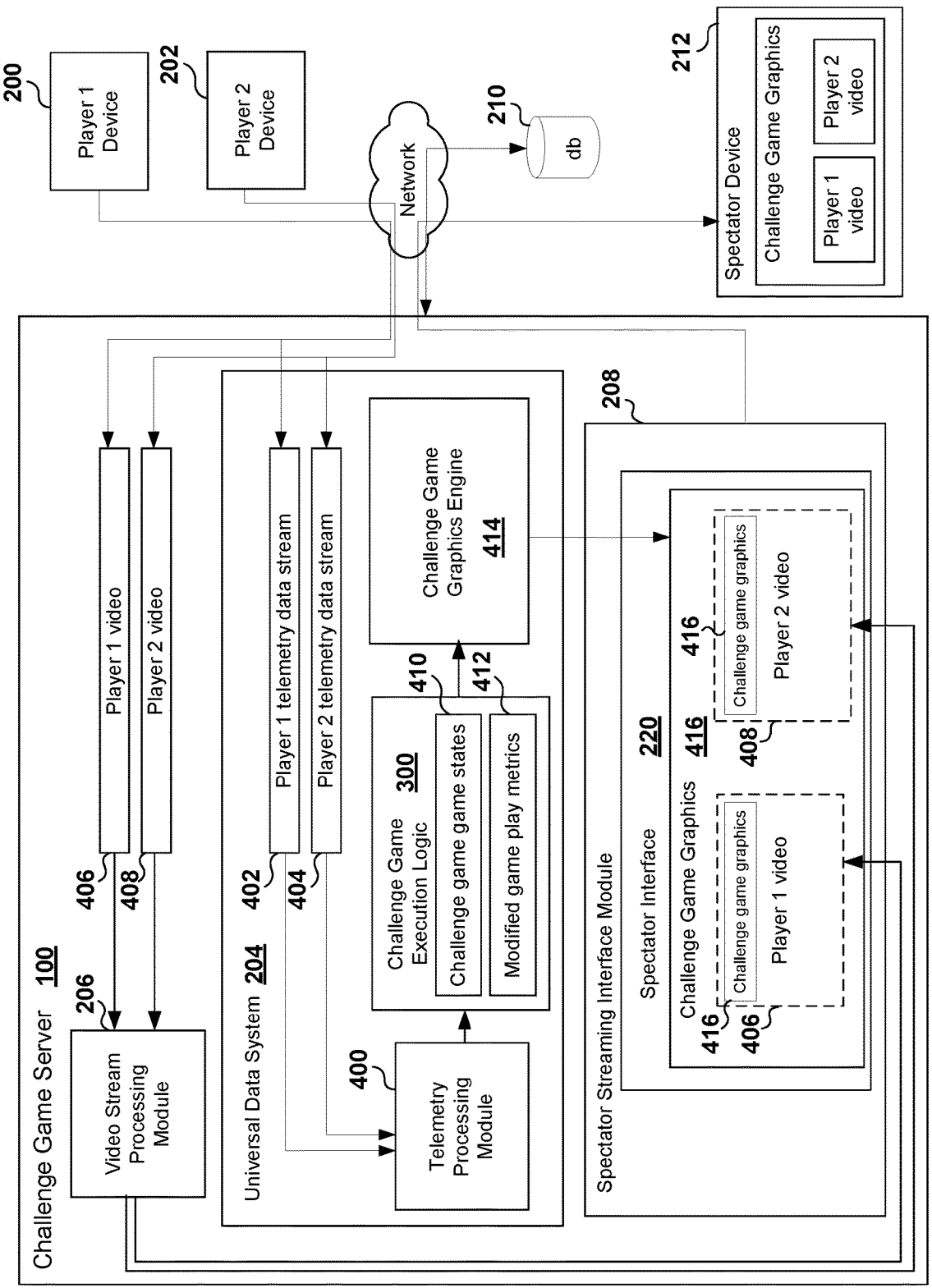
FIG. 4 shows a conceptual diagram of a challenge game server and certain associated components for providing a spectator device with a view of a challenge game between a first and second player as they play a game segment on first and second player device, according to one embodiment.

FIG. 4 shows a conceptual diagram of a challenge game server 100 and certain associated components for providing a spectator device 212 with a view of a challenge game between a first and second player as they play a game segment on first player device 200 and 202, respectively. As the first player plays the game segment for the challenge game on the first player device 200, a first telemetry data stream 402 and a first video 406 is generated as a result. Likewise, when the second plays the game segment on the second player device 202, a second telemetry data stream 404 and a second video 408 is generated as a result. The first and second telemetry data streams 402 and 404 are shown to be routed to the universal data system 204.

The universal data system 400 serves to process and manipulate the first and second telemetry data streams 402 and 404 to generate meaningful data for the challenge game from raw telemetry data for display on the spectator device 212. For example, it is contemplated that the first and second telemetry data streams 402 and 404 include data related to game inputs and actions made by the player, virtual distance measurements between the player and enemies and points of interest, and other measurements related to the state of the game segment as it is being played. The telemetry processing module 400 is configured to process the telemetry data into information that the challenge game execution logic 300 can operate on such as game play metrics and game segment game states.

Continuing with the fantasy video game example having an objective of defeating a dragon, the first and second telemetry data streams 402 and 404 may include, for example, data related to a distance between both players and the dragon within their respective game segments as well as data related both players' health. As a result of such processing by the telemetry processing module 400, the game states for the game segments as played by the first and second players may be approximated for further processing by the challenge game execution logic 300. For example, the telemetry processing module 400 may be operable to determine, from the first and second telemetry data streams 402 and 404, the distance between the first player and the dragon and the distance between the second player and the dragon in their respective game segment game sessions (e.g., in real time or near real time). Likewise, as a result of such processing by the telemetry processing module 400 of the first and the second telemetry data streams 402 and 404, the game play metrics of the first and second players may be determined. It is contemplated that the telemetry processing module 400 is to process the first and second telemetry data streams 402 and 404 in real time or near real time.

According to the embodiment shown in FIG. 4, the challenge game execution logic 300 processes and transforms the data generated by the telemetry processing module 400 according to challenge game rules. For example, as the telemetry processing module 400 generates game states of the game segment, the challenge game execution logic 300 may generate, based on the game states of the game segments, challenge game game states 410. If the game states of the game segments include data related to the distance between both players and the dragon, then the challenge game game states 410 may include state information related to how much closer the first or second player is to the dragon than the other player. Moreover, the challenge game execution logic 300 is configured to transform the game play metrics as determined by the telemetry processing module 400 into modified game play metrics 412. For example, if the game play metrics as generated by the telemetry processing module 400 have an indication of both players' health, the challenge game execution logic 300 may indicate a different health of either player due to challenge game rules that are implemented by the challenge game execution logic 300. Continuing with the fantasy game example, if the challenge game rules include a penalty for using magic and the first player happens to use magic, then the challenge game execution logic 300 is operable to apply the penalty to the health of the first player as reflected in the modified game play metrics 412. It is contemplated that the challenge game game states 410 and the modified game play metrics 412 are generated by the challenge game execution logic 300 in real time or near real time.

According to the embodiment shown FIG. 4, the challenge game game states 410 and the modified game play metrics 412 as generated by the challenge game execution logic 300 are used by the challenge game graphics engine 414 to generate challenge game graphics 416. Challenge game graphics 416 are contemplated to include various indicators of progress of the first player and the second player as they play the game segment. For example, the challenge game graphics engine 414 may use the challenge game game states 410 to generate a proximity indicator bar that is configured to graphically represent how close either of the players are with respect to the dragon or points of interest or even the other player. Additionally, the challenge game graphics engine 414 may use the modified game play metrics 412 to generate graphical representations of various metrics for both players.

In some embodiments, it is contemplated that the challenge game graphics engine 414 is able to replace the game play metrics native to either player's playing of the game segment with the modified game play metrics. Continuing with the fantasy game example having a penalty for using magic and assuming the first player has used magic, the health of the first player that is native to the game segment may be 1000, for example. However, when the challenge game execution logic 300 applies the penalty when generating the modified game play metrics 412, the health of the first player may be only 600 within the challenge game and under the challenge game rules. The challenge game graphics engine 414 is operable to indicate so. In one embodiment, the challenge game graphics engine 414 may produce a health bar reflecting the first player's health of 600 to be displayed within the challenge game graphics 416 at some location outside of the first and second video 406 and 408 within the spectator interface 220. In such an embodiment, first video 406 may display the native health of the first player as being 1000, while the challenge game graphics 416 may display the health as being 600. In another embodiment, the challenge game graphic engine 414 or the spectator streaming module 208 or the video stream processing module 206 might replace the native health of 1000 of the first player with the health of 600 within the first video 406 for the spectator interface 220.

According to the embodiment shown in FIG. 4, the first and second videos 406 and 408 are routed to the video stream processing module 206 for processing. According to some embodiments, the first and second videos 406 and 408 are both streaming videos that are multicast by the first and second player device 200 and 202, respectively, as the first and second players play the game segment. In other embodiments, one or both of the first and second videos 406 and 408 are not streaming, but instead are retrieved from storage such as database 210 as stored from previous play of the game segment. In any case, the first and second videos 406 and 408 are made to play in synchrony within the spectator interface 220. The challenge game server 300 is shown to be in communication with the spectator device 212 for delivering the spectator interface 220 for viewing by a spectator.

Figure 5:
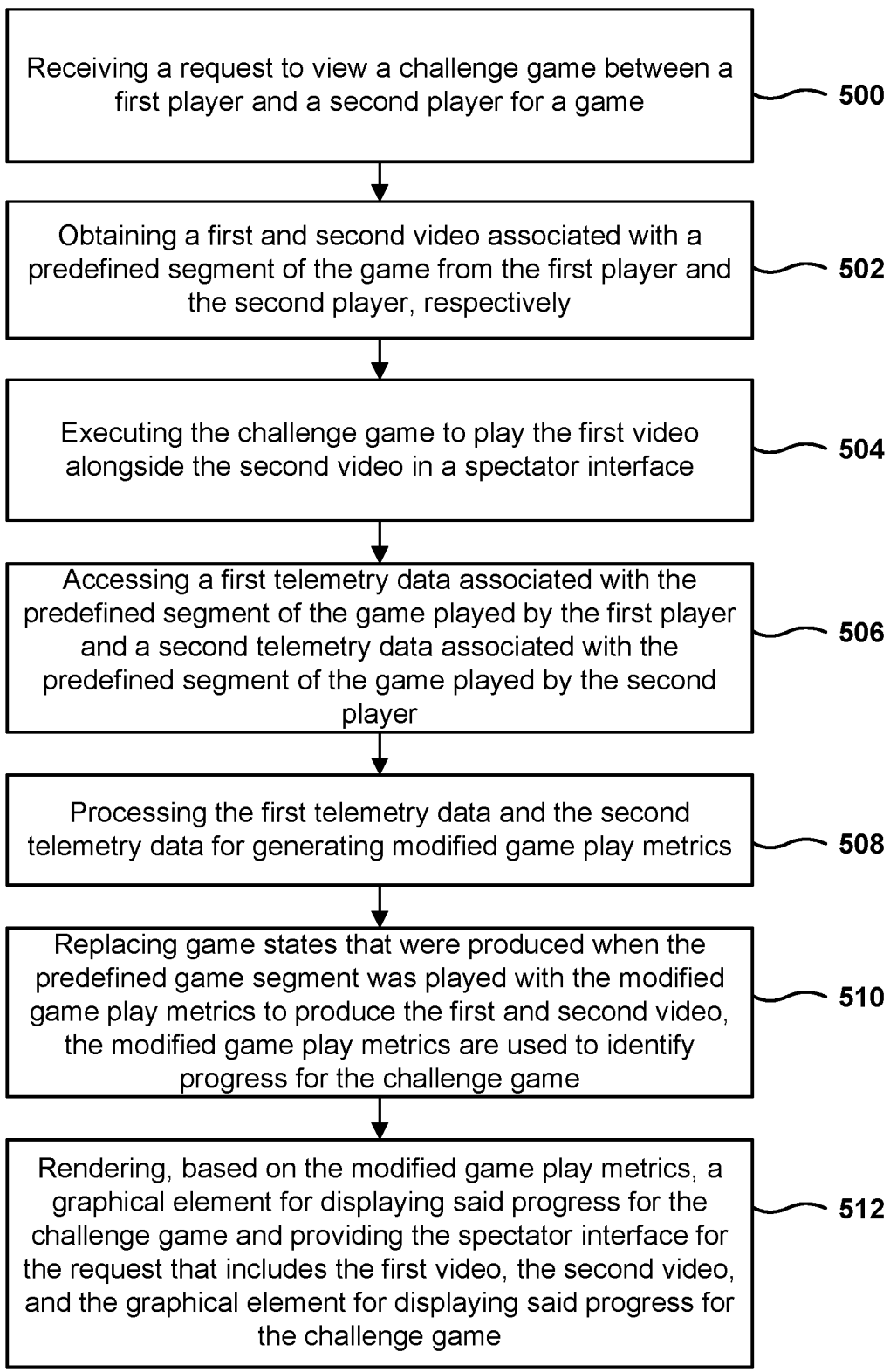
FIG. 5 shows an overall flow of a method of executing a challenge game for display to one or spectators, according to one embodiment.

FIG. 5 shows an overall flow of a method of executing a challenge game for display to one or more spectators. In operation 500, the method includes receiving, at, for example, a challenge game server, a request to view a challenge game between a first player and a second player. The request may have originated from a spectator who desires to watch a challenge game match on a spectator device. The spectator may be given access to an array of challenge games that are available for view via an interface that is accessible via a web browser or other application executed on a computer, a mobile device, a tablet, a console system such as a PlayStation®, a virtual reality system such as PSVR®, etc.

In operation 502, the method provides for obtaining a first and second video generated as the first and second player play the predefined segment of the game. As noted above, the predefined segment may be segment of a full-length video game that is defined by a starting point and end point and may be defined by a time box as well. In some embodiments, the first and second videos are live streams of the predefined segment being played by the first and second player. This may be referred to as a synchronous challenge game. In other circumstances, the challenge game may also support asynchronous play. For example, in some embodiments, the first video may be a live video feed that is multicast by the first player device of a first player, while the second video may a stored video file from a previous game session of the predefined segment by the second player. In still other embodiments, both the first and second videos may be from previous game sessions played by the first and second player, the first and second videos being retrieved from storage.

Operation 504 of the method embodiment shown in FIG. 5 serves to execute the challenge game. According to some embodiments, the challenge game is a saved data file that is executable by the challenge game server. Various aspects of creating challenge games will be described in more detail with reference to FIGS. 6-8. One of the functions of executing the challenge game is to display the first video and the second video in a side by side configuration in a spectator interface such that the spectator can view the game action of the first and second player in synchrony. As a result, the spectator is provided with a simultaneous view of both the game play of the first player and the second player as both the first and second player attempt to achieve the objective defined by the challenge game under the rules specified.

In operation 506, the method includes accessing a first telemetry data associated with the predefined segment of the game played by the first player and a second telemetry data associated with the predefined segment of the game played by the second player. The telemetry data includes data related to game actions as inputted by the first and second players as well as measurements of game state related information such as distances between the first and second player and other objects within the game and other native or original metrics related to game play. The telemetry data accessed in operation 506 is then processed in operation 508. For example operation 508 includes generating modified game play metrics from the game play metrics included in the telemetry data based on rules defined by the challenge game.

According to the embodiment shown in FIG. 5, operation 510 serves to replace game states (e.g., native or original metrics) that were produced when the predefined game segment was played with the modified game play metrics for the first and second video. In one example, operation 510 may overlay the modified game play metrics on the native or original metrics that appear in the first and second video to generate modified first and second videos. In other embodiments, modified game play metrics may be displayed within an area that is outside of the region for embedding the first and second videos. In any case, the modified game play metrics are displayed in connection with the first and second players playing the predefined game segment and are updated in real time or near real time. The modified game play metrics are indicative of the progress made by both players with respect to the challenge game. For example, the modified game play metrics may include data that is usable to generate progress bars that indicate how close either player is to completing the objective for the predefined challenge game segment.

In operation 512, the method includes rendering, based on the modified game play metrics, a graphical element for displaying said progress for the challenge game and providing the spectator interface for the request. The spectator interface is contemplated to include at least the first video, the second video, and the graphical element for displaying said progress for the challenge game. It is contemplated that the graphical element is to include graphical representations of the modified game play metrics. For example, the graphical element may include various indicators of progress made by either player with respect to the predefined game segment, including the players' health, abilities, proximity to enemies, handicaps, restrictions, penalties, etc. Thus, when the spectator interface is provided to the spectator device, the spectator is given both a first person view of each player's game play as well as an additional view of their progress as provided by the graphical element.

Figure 11:
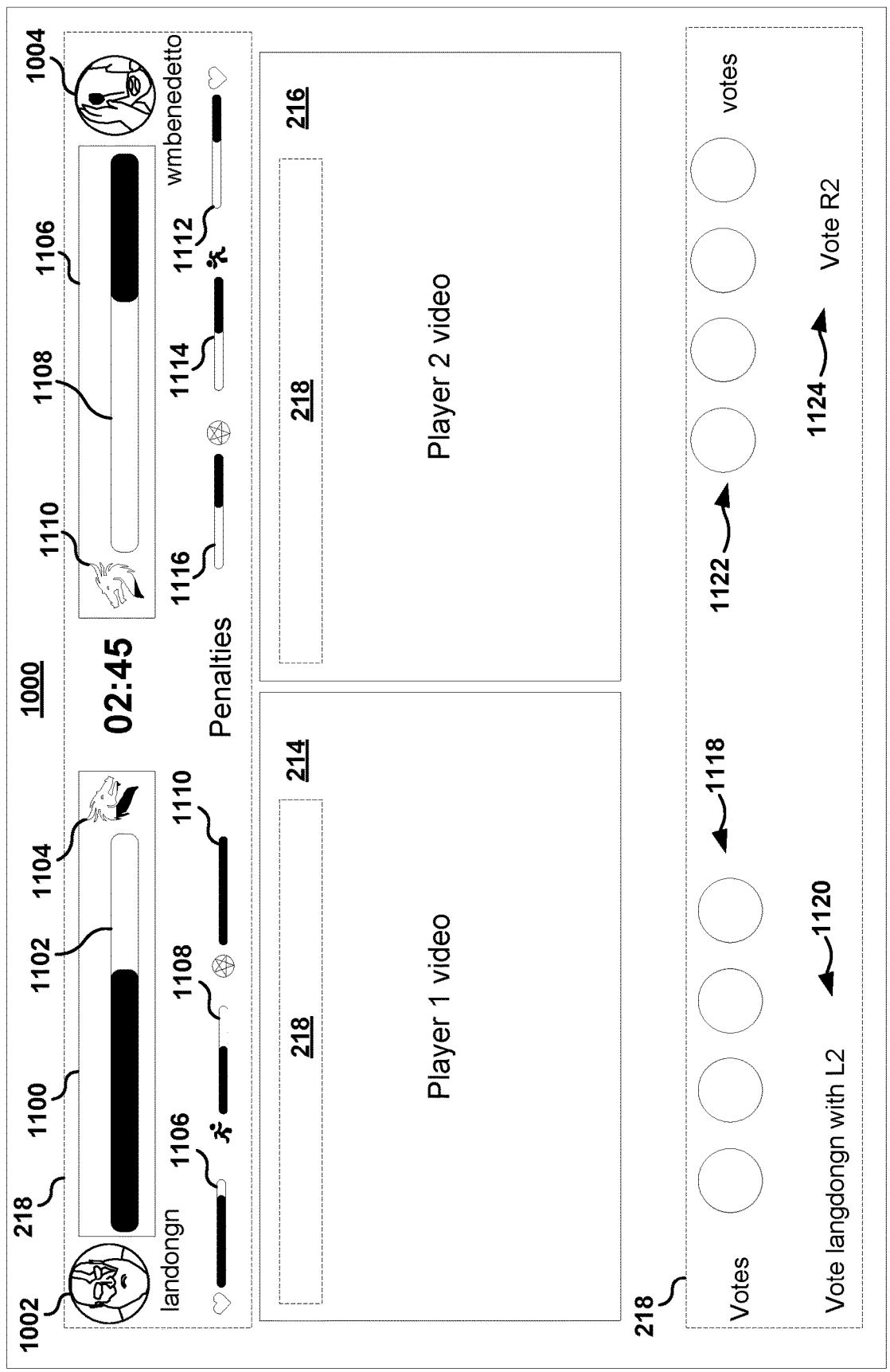
FIG. 11 shows a challenge game in progress as it may be viewed by a spectator via the spectator view or interface, according to one embodiment.

In some embodiments, such as those shown in FIGS. 2, 4, and 11, the spectator interface includes a side-by-side display of a first player video stream and a second player video stream. In other embodiments, the spectator interface may include one video stream that displays action from both the first player video stream and the second player video stream by intercutting between the two. The intercutting between the two video streams may be decided and implemented algorithmically based on interesting things happening in the respective video streams, according to one embodiment. In others, the intercutting may be performed manually by a producer or a controller who toggles between the two video streams based on judgment.

Figure 6:
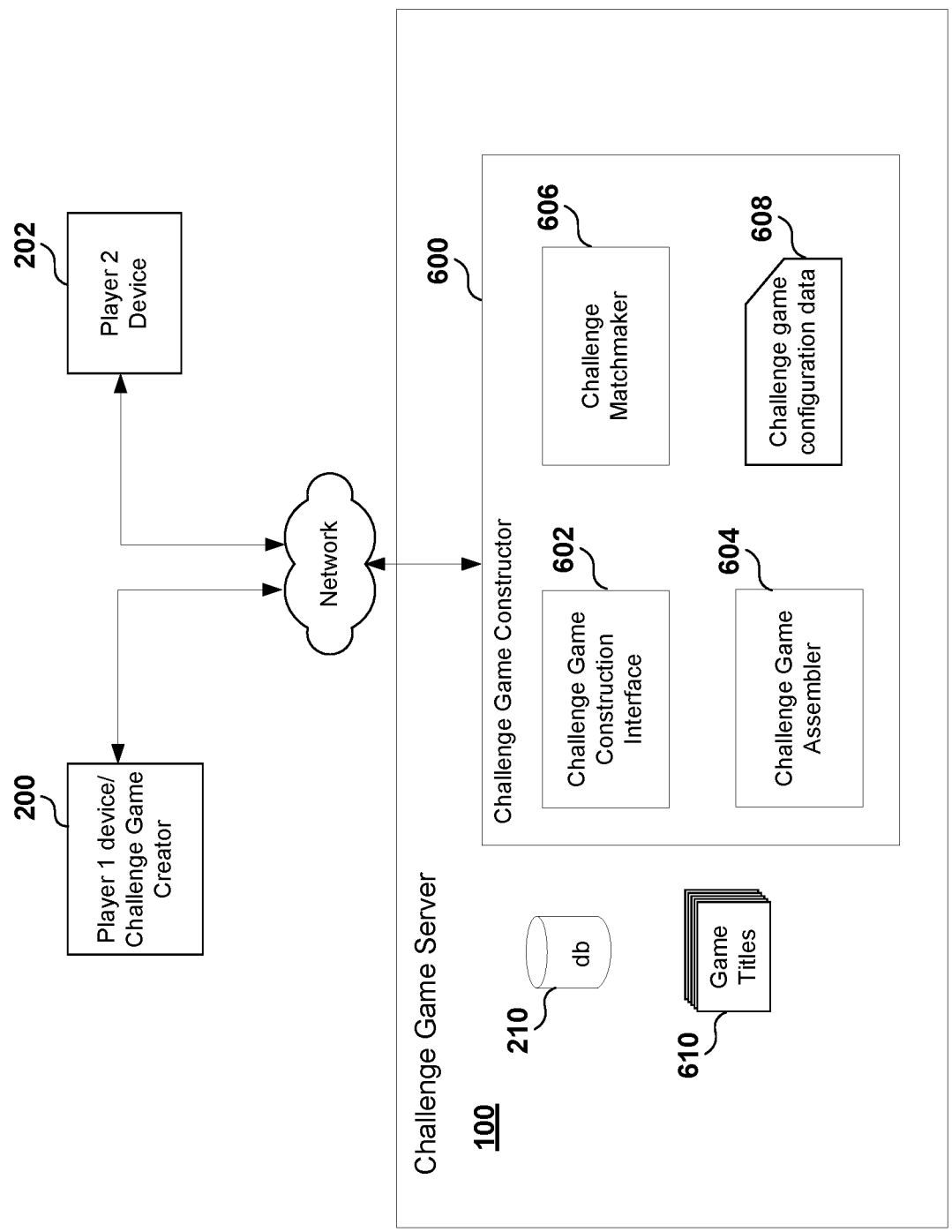
FIG. 6 shows a conceptual illustration of the challenge game server as it relates to enabling a first player of a first player device to create a challenge game for a second player to play on a second player device, according to one embodiment.

FIG. 6 shows a conceptual illustration of the challenge game server 100 as it relates to enabling a first player of a first player device 200 to create a challenge game for a second player to play on a second player device 202. When the first player completes a game session in a video game, they may wish to create a challenge game based on a segment of the video game completed during the game session. The challenge game server 100 is envisioned to enable the first player to do so. In some embodiments, the first player may want to create a public challenge game in which anyone can compete. In other embodiments, the first player may want to selectively challenge one or more players, including the second player. In either instance, a challenge game constructor 600 of the challenge game server allows the first player to define the content of the of the challenge game for challenging other players via a challenge game construction interface 602. The challenge game construction interface 602 may have access to the game session previously played by first player via database 210.

According to the embodiment shown in FIG. 6, the challenge game construction interface 602 communicates a graphical user interface (GUI) to the first player device 200 upon completion of the game session wherein the first player can define various parameters and rules of the game segment to be played for the challenge game. For example, the first player may define a start point, an end point, an objective, a time limit, character abilities, and one or more restrictions, penalties, and handicaps to be associated with the challenge game. The challenge game construction interface 602 is also contemplated to enable the first player to specify one or more players that the first player wishes to challenge.

According to the embodiment shown in FIG. 6, the challenge game assembler 604 is configured to assemble the challenge game, including the game segment, the challenge game rules and parameters, and the one or more players being challenged, as defined via the challenge game construction interface 602. The challenge game assembler 604 may have access to various game titles 610, including the video game from which the game segment is to be created. The challenge game assembler 604 may then generate challenge game configuration data 608 that is communicated to the one or more players being challenged so that the one or more players can play the game segment to compete in the challenge game. In one embodiment, a challenge matchmaker 606 is configured to communicate with the one or more players to be challenged, as well as any additional players, information regarding the challenge game. The challenge matchmaker 606 may also be configured to deliver the challenge game configuration data 608 to the devices of the one or more players for subsequent play.

Figure 7:
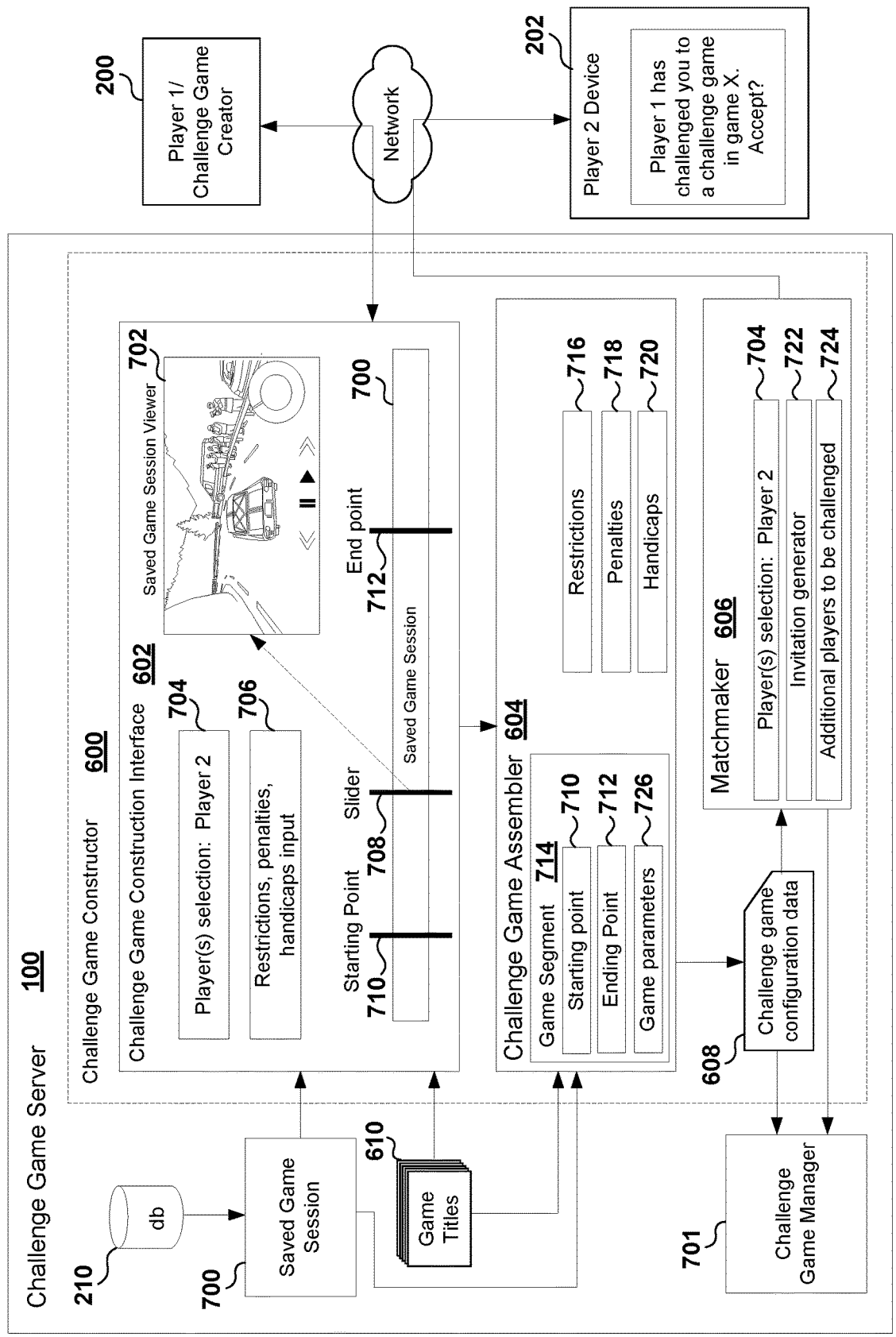
FIG. 7 shows an additional view of a challenge game server as it relates to enabling a first player of a first player device to create a challenge game based on a game session previously played, according to one embodiment.

FIG. 7 shows an additional view of a challenge game server 100 as it relates to enabling a first player of a first player device 200 to create a challenge game based on a game session previously played. In the example shown, the first player has completed a session of a racing game and wishes to challenge a second player for a segment of the video game session. For example, the first player may have achieved a personal record in a segment of the racing game that is particularly challenging. The first player is enabled to create a challenge game based on that segment to have the second player play a similar or same segment of the video game for the challenge game.

In the embodiment shown in FIG. 7, the challenge game construction interface 602 of the challenge game constructor 600 accesses a saved game session 700 associated with the first player's prior game session. The challenge game construction interface 602 may present the saved game session 700 to the first player in a playback mode via a saved game session viewer 702. The first player may scrub through the saved game session 700 using slider 708 while viewing the video associated with the saved game session 702 via the saved game session viewer 702. In so doing, the first player may identify the points in the saved game session 700 that they wish to be the starting point 710 and the end point 712 of the game segment 714 for the second player to play. It is contemplated that the game segment 714 may range in duration from about 5 seconds or less to about 1 hour or more, or from about 30 seconds to about 30 minutes, or from about 1 minute to about 10 minutes.

According to the embodiment shown in FIG. 7, the challenge game construction interface 602 further enables the first player to specify a player selection 704 for the challenge game as well as to define restrictions, penalties, and handicaps 706 for the challenge game. Other parameters, although not shown, may also be specified by the first player when interacting with the challenge game construction interface 602.

In various embodiments, the challenge game assembler 604 is enabled to create the challenge game based on the various inputs received from the first player. For example, the challenge game assembler 604 is contemplated to generate the game segment 714 that is to be played by the second player based on the selection of the starting point 710 and the end point 712, and based on data from game titles 610. The game segment 714 is also generated with game parameters 726 that reflect certain game parameters associated with the saved game session 700 such that the game segment 714 mirrors the selected segment of the game session 700 as played. For example, the game parameters 726 may specify the same car for the game segment 714 that the first player raced in the game session. The challenge game assembler 604 is able to assign the game parameters 714 by reading data from the saved game session 700, according to some embodiments. In addition to creating the playable game segment 714, the challenge game assembler 604 is contemplated to also assign to the challenge game restrictions 716, penalties 718, and handicaps 720 as inputted via the challenge game construction interface 602.

The challenge game assembler 604 is shown to output the challenge game configuration data 608, which includes the game segment 714 for the second player to play as well as data associated with the challenge game. The game segment 714 is delivered to the second device 202 of the second player if the second player accepts an invitation to participate in the challenge game, the invitation being generated by an invitation generator 722 of matchmaker 606. The matchmaker 606 may also deliver invitations to additional players to be challenged 724 such that one or more additional players can participate in the challenge. The challenge game configuration data 608 is also delivered to a challenge game manager 701, which is contemplated to execute the challenge game in synchrony with the second player playing the game segment 714.

In some embodiments, when the second player plays the game segment 714 for the challenge game, it may be asynchronous to the first player's playing of the game session. However, in other embodiments, the first player may play the game segment 714 again such that both the first player and the second player play the game segment 714 synchronously for the challenge game.

Figure 8:
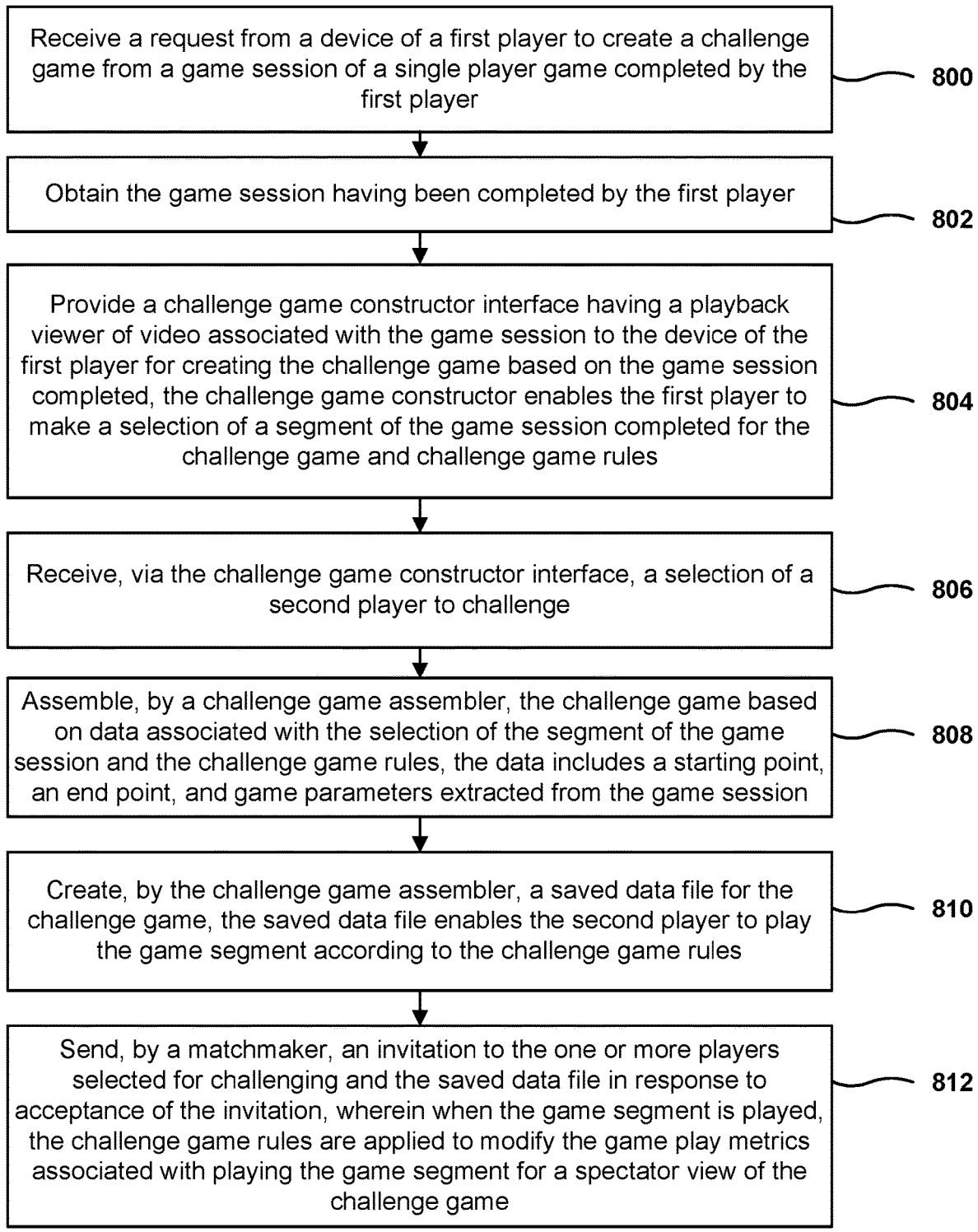
FIG. 8 shows an overall flow of a method for enabling a first player to create a challenge game based on a game session previously played, according to one embodiment.

FIG. 8 shows an overall flow of a method for enabling a first player to create a challenge game based on a game session previously played. The method includes an operation 800 for receiving (e.g., at the challenge game server 100) a request from a device of a first player to create a challenge game from a game session of a single player game completed by the first player. The game session may have been completed immediately prior to requesting that a challenge game be made, or it may have been a game session that was played some time ago. In any case, operation 802 serves to obtain the game session having been completed by the first player, the game session includes game state data for the game session that is usable to define a game segment.

According to the method embodiment shown in FIG. 8, the method then flows to operation 804, which serves to provide a challenge game construction interface to the device of the first player for creating the challenge game based on the completed game session. The challenge game construction interface may be similar to the one shown in FIG. 7. The challenge game construction interface enables the first player to make a selection of a segment of the game session completed for creating a playable game segment for a second player. In some embodiments, the selection of the segment may include the entire game session, while in other embodiments, the selection may include only a subset of the game session completed. If the completed game session has more than one segment that the first player wishes to create a challenge game out of, certain embodiments may allow the first player to select a plurality of segments from the game session to create challenge games from.

In operation 806, a selection of a second player to be challenged is received via the challenge game construction interface. The first player may specify any number of other players to be challenged, or may make the challenge open to the public where any player can participate in the challenge game and go head-to-head with the first player in their respective challenge games. The method then flows to operation 808, which serves to assemble, by a challenge game assembler, the challenge game based on data associated with the selection of the segment of the game session. It is contemplated that such data will include a starting point, an end point, and game parameters that are extracted from the game session. Further, in operation 810, the challenge game assembler creates a saved data file, or a configuration file, or a boot parameter file for the challenge game that enables the second player to play the challenge game. In particular, the saved data file for the challenge game is to include at least data for executing a game segment that is to be played by the second player as well as data for executing the challenge game. The game segment may be executed on a device of the second player or may be executed on the challenge game server, while the challenge game is to be executed at the challenge game server, according to various embodiments.

The method shown in FIG. 8 proceeds to operation 812, which serves to send, by a matchmaker, an invitation to the one or more players selected to be challenged. In response to acceptance of the invitation, the saved data file for the challenge game, or at least the data associated with executing the game segment of the challenge game is sent to respective devices of the one or more players to be challenged.

In accordance with one embodiment related to the method shown in FIG. 8, a method includes an operation for receiving a request from a device of a first player to create a challenge game. The method provides for an operation that provides, to the device of the first player, an interface that enables the first player to predefine challenge game rules that are to be applied during executing the challenge game, the interface further enables the first player to make a selection of a segment of a video game to be played as a segment for the challenge game. The method further includes creating the challenge game based on the predefined challenge game rules and based on the selection of the segment of the video game and sending the challenge game for enabling the second player to play the game segment, wherein the native game play metrics are produced when the second player plays the game segment. The method further includes an operation for executing the challenge game while the second player plays the game segment, the executing the challenge game includes applying the predefined challenge game rules to modify the native game play metrics of the second player for generating modified game play metrics for the second player. When the challenge game is executed, a spectator view for displaying the modified game play metrics is generated.

In a related method embodiment, the executing the challenge game for generating modified game play metrics for the second player includes processing telemetry data associated with the game segment as played by the second player that is indicative of the native game play metrics of the second player. The method further includes transforming, according to the predefined challenge game rules, the native game play metrics of the second player for said generating the modified game play metrics for the second player. In these and other embodiments, the native game play metrics for the second player are configured to replace the native game play metrics of the second player in the spectator view such that the modified game play metrics for the second player are displayed in place of the native game play metrics of the second player. In these and other embodiments, said executing the challenge game is further configured for applying the predefined challenge game rules to modify native game play metrics associated with the first player having played the game segment for generating modified game play metrics for the first player. In these and other embodiments, the executing the challenge game for generating modified game play metrics for the first player includes operations for processing telemetry data or game state data associated with the game segment as played by the first player, the telemetry or game state data are indicative of the native game play metrics of the first player and for transforming, according to the predefined challenge game rules, the native game play metrics of the first player for said generating the modified game play metrics for the first player. In these and other embodiments, the modified game play metrics for the first player are configured to replace the native game play metrics of the first player in the spectator view such that the modified game play metrics for the first player are displayed in place of the native game play metrics of the first player. In these and other embodiments, when the second player plays the game segment for the challenge game, the native game play metrics of the second player are configured to be displayed to the second player without display of the modified game play metrics. In these and other embodiments, the predefined challenge game rules include one or more of a limitation, a restriction, a penalty, a handicap, and a reward.

Figure 9:
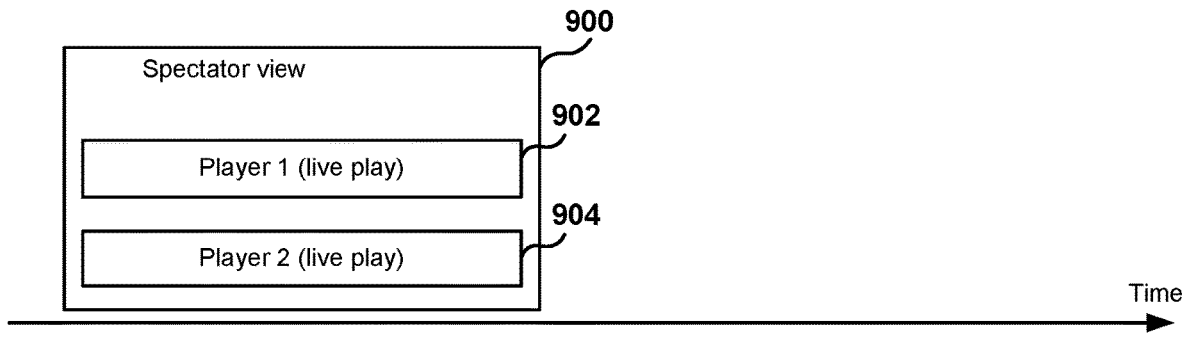
FIG. 9 shows conceptual illustrations of various embodiments for which challenge games may be played synchronously or asynchronously and viewed by spectators in real time or as a non-live view, according to various embodiments.
Figure 9:
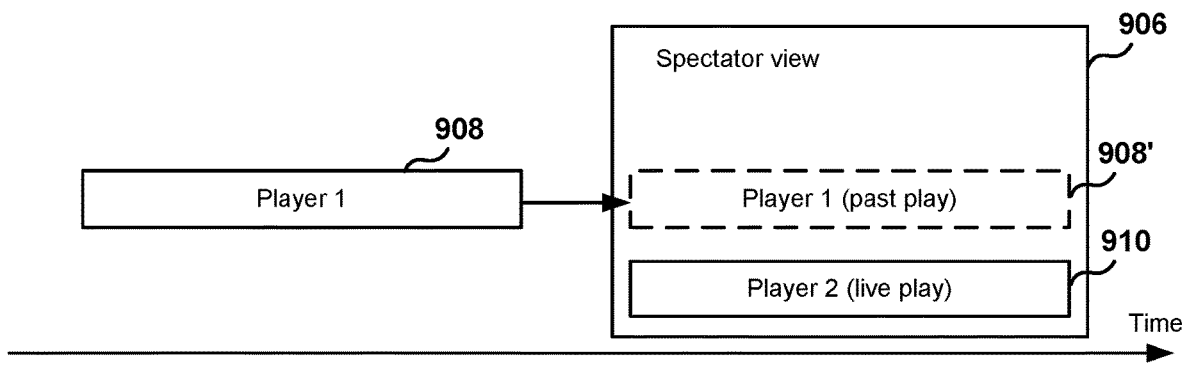
Figure 9:
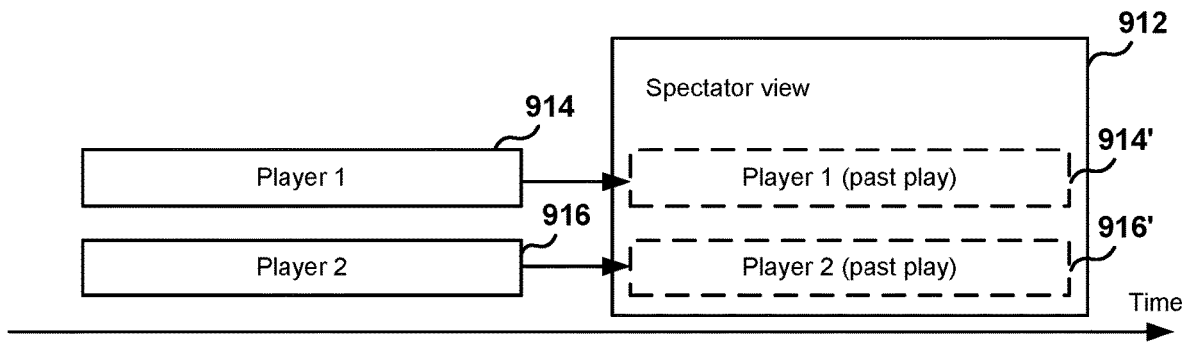

FIG. 9 shows conceptual illustrations of various embodiments for which challenge games may be played synchronously or asynchronously and viewed by spectators in real time or as a non-live view. In a first embodiment, a challenge game is played synchronously by a first and second player and viewed live in a spectator view 900. For example, the player 1 game segment 902 and a player 2 game segment 904 are shown to begin at about the same time along a time axis and proceed in parallel to about the same time when the challenge game is completed. The spectator view 900 is shown to encompass the player 1 game segment 902 and the player 2 game segment 904 from their beginning to their end.

In another embodiment, an asynchronous mode of playing the challenge game is shown, with a live view of the challenge game for the spectator view 906. A player 1 game segment 908 is shown to take place at an earlier period in time than a player 2 game segment 910. When the second player initiates the player 2 game segment 910, the player 1 game segment 908 that was played in the past is re-run as a player 1 game segment replay 908' within the live spectator view 906. As a result, the spectator view 906 displays the player 1 game segment replay 908' alongside the player 2 game segment 910 synchronously such that it appears as though the first and second players are playing the game segment synchronously.

In another embodiment of FIG. 9, a synchronous or asynchronous challenge game that is displayed in a non-live spectator view 912 is provided. A player 1 game segment 914 and a player 2 game segment 916 are shown to occur prior to the spectator view 912 of the challenge game. Both the player 1 game segment 914 and the player 2 game segment 916 are re-broadcast as player 1 game segment replay 914' and player 2 game segment replay 916' in the spectator view 912, respectively. As a result, a spectator having the spectator view 912 is able to view the challenge game as though the first and second players are playing the game segment synchronously and in real-time.

Figure 10:
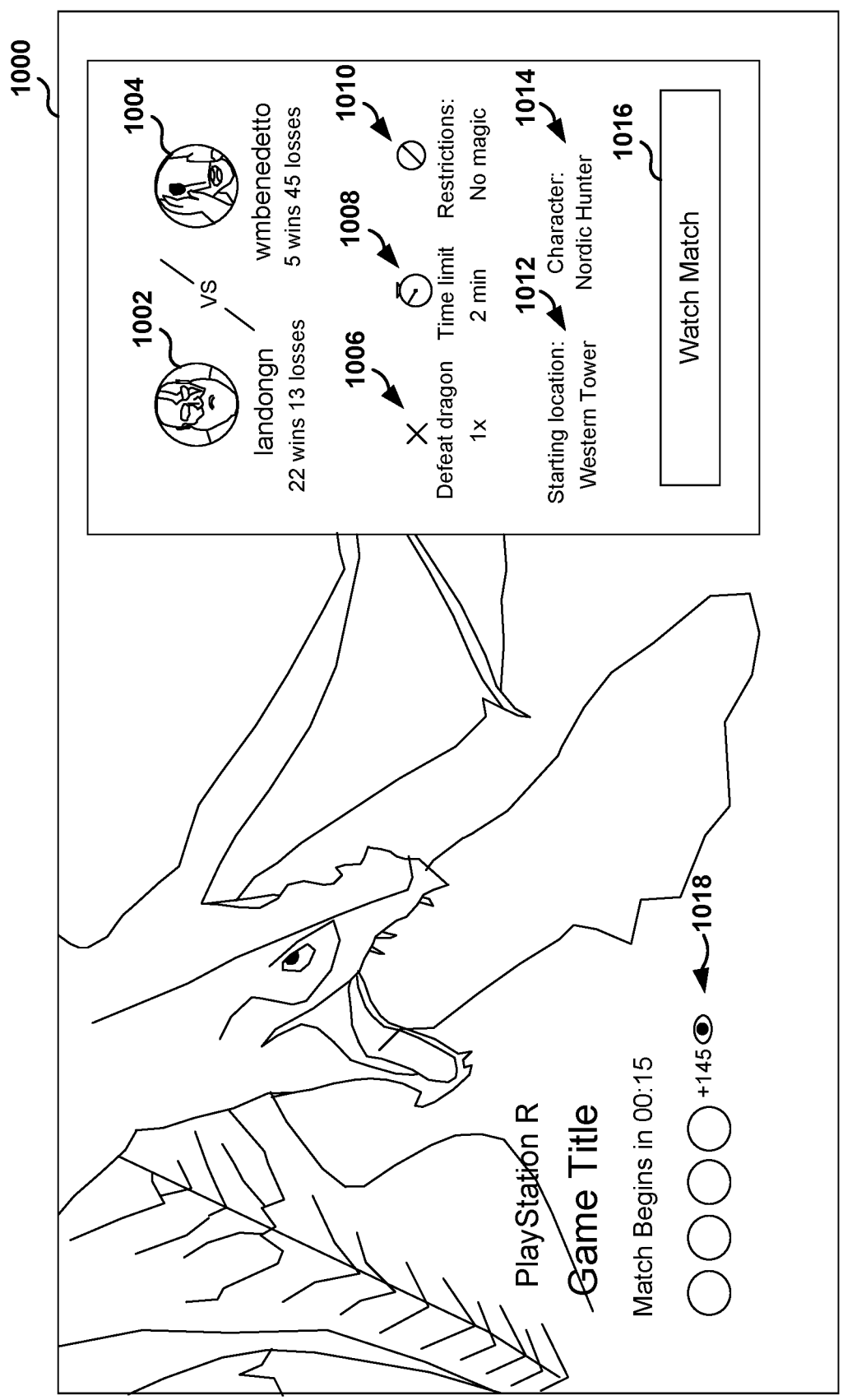
FIG. 10 shows an embodiment of a spectator view of a staging area for a challenge game between first and second player that is about to begin, according to one embodiment.

FIG. 10 shows an embodiment of a spectator view 1000 of a staging area for challenge game between player landongn 1002 and player wmbenedetto 1004 that is about to begin in 15 seconds. The spectator view 1000 is shown to include an indication of the game segment that is to be played, including an objective 1006 of defeating the dragon, a time limit 1008 that time-boxes the game segment, restrictions 1010 that specifies that no magic should be used, a start point 1012, as well as the character 1014 that both players are to play. Although not shown, indications of additional game parameters and challenge game rules may also be displayed in the staging area, including penalties, abilities, limitations, etc. The staging area is also shown to display spectator information 1018 that may include an indication of any friends that are also going to spectate in the challenge game and a total number of spectators. The spectator may decide to view the challenge game by selecting the watch match button 1016.

FIG. 11 shows a challenge game in progress as it may be viewed by a spectator via the spectator view 1000. The spectator view 1000 is shown to include the first player video 214 and the second player video 216 and challenge game graphics 218. The first player video 214 and the second player video 216 displayed in synchrony and are multicast from the execution of the game segment as it is being played by player landongn 1002 and player wmbenedetto 1004. As the game segment is being played, the challenge game graphics 218 are being generated by the challenge game server, for example, in a way shown in FIGS. 2-4. The challenge game graphics 218 include overall progress indicators 1100 and 1106 for the first and second players, respectively, which indicate generally how close the player is to completing the objective 1006 of the game segment. For example, the overall progress indicators 1100 and 1106 each include progress bars 1102 and 1108 that represent a degree of progress for the first and second players, respectively. In the example shown, player landongn 1002 appears to have made more progress in the game segment than player wmbenedetto 1004, as shown by the relative fill of the progress bars 1102 and 1008. Moreover, the overall progress indicator 1100 and 1106 include health indicators 1104 and 1110 of the enemy dragon. Again, it appears from FIG. 11 that player landongn 1002 has done more damage to the dragon than player wmbenedetto 1004 has, as shown by the progressive fill of the health indicators 1104 and 1110 of the dragon.

In addition, the challenge game graphics 218 is shown include to game play metrics indicators that convey more detail about how each player is doing within the game segment. For example, a health indicator 1106, a stamina indicator 1108, and a magic indicator 1110 are shown to be associated with player landongn 1002 while a health indicator 1112, a stamina indicator 1114 and a magic indicator 1116 are shown to be associated with player wmbenedetto 1004. In the example shown, player landongn 1106 has about 80% of their health remaining and about 50% of their stamina, while player wmbenedetto 1004 has about 40% of their health remaining and about 50% of their stamina. With respect to the magic indicators 1110 and 1116, player landongn 1110 is shown to have a full bar of magic, meaning, for example, that they haven't used any magic. In contrast, player wmbenedetto 1004 is shown to have a half a bar of magic, meaning that they have used 50% of the allowed but penalized use of magic. That player wmbenedetto 1004 has used magic may explain why their health is so low, since one of the penalties for using magic may be to increase how susceptible player wmbenedetto 1004 is to taking damage. For example, the amount of damage the players take may be scaled according to the amount of magic that they use as a penalty.

Challenge game servers are also contemplated to enable a level of interaction between the spectators and the challenge game. In the embodiment shown in FIG. 11, the spectators are allowed to vote as to which player they believe will win the challenge game. Options 1120 and 1124 are indicators within the challenge game graphics 218 that instruct the spectator on how to vote for either player. Cohorts 1118 and 1122 as shown in the challenge game graphics 218 represent which of the spectators have already voted for which player. In addition to voting, it is contemplated that the challenge game server might also enable spectators to wager virtual or real currency. In other embodiments, the challenge game graphics may also include a chat box for the spectators to interact with one another.

While some of the challenge game graphics 218 are shown to appear in the spectator view 1000 at a location that is outside of the first player video 214 and the second player video 216, challenge game graphics 218 are also contemplated to appear within the first player video 214 and the second player video 216. For example, various indicators of progress might also be overlaid on the first player video 214 and the second player video 218.

Figure 12:
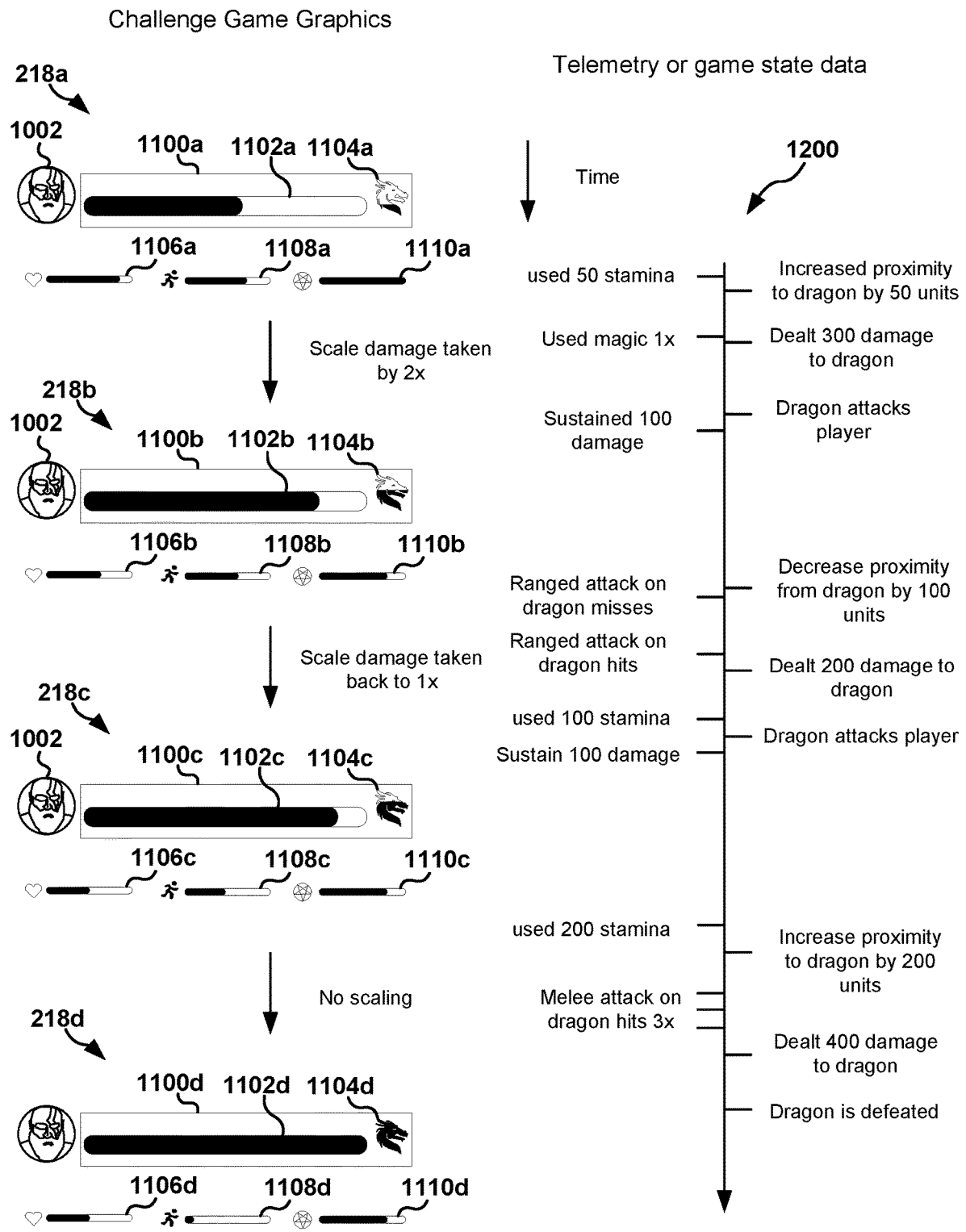
FIG. 12 shows a conceptual illustration of how telemetry data or game state data for a game segment being played are processed to generate changes to the challenge game graphics at four representative points in the game segment, according to one embodiment.

FIG. 12 shows a conceptual illustration of how telemetry or game state data 1200 for a game segment being played are processed to generate changes to the challenge game graphics 218a-218d at four representative points in the game segment. The telemetry or game state data 1200 is shown as a timeline of a sequence of events in relative order in which they may occur during play of the game segment.

In challenge game graphics 218a, player landongn 1002 is shown by progress indicator 1102a to have completed about half of the game objective and by health indicator 1104a of the dragon to have reduced the dragon's health by about 30%. It is noted that the progress indicator 1102a may have more than one input that the health of the dragon. For example, there may be additional variables that factor into the progress indicator 1102a, such as completion of additional or supplementary objectives or goals that might be defined by the game segment, a proximity the player is to the dragon, various game play metrics, among others. Additionally, player landongn 1002 is shown by health indicator 1106a to have about 80% health left, by stamina indicator 1108a to have about 70% stamina left, and by magic indicator 1110a to have used no magic.

According to the telemetry or game state data 1200 shown in FIG. 12, a number of events occur between the time of challenge game graphics 218a and 218b, including the use of 50 stamina, increased proximity to dragon by 50 units, use of magic one time, dealing of 300 damage to dragon, attacking of player by dragon, and sustaining 100 damage. The events of the telemetry or game state data 1200 is processed by the challenge server, for example, by the telemetry processing module 400 and/or the challenge game execution logic 300 to generate modified game play metrics and challenge game game states, which are then used to generate changes to the challenge game graphics 218a.

For example, at the next shown point in the game segment, challenge game graphics 218b reflect certain changes to the game play metrics and challenge game game states in response to the sequence of events of the telemetry or game state data 1200. In challenge game graphics 218b, for example, the progress indicator 1102b shows that the player landongn 1002 has completed about 80% of the game segment, reflecting, for example, that the player has increased proximity to the dragon by 50 units and has done damage to the dragon. In response to the dragon taking 300 damage from the player's use of magic, the health indicator 1104b for the dragon is shown to be about 70% defeated. However, because the player used magic, their susceptibility to taking damage is shown to be scaled by a factor of two. Thus, when the dragon attacks the player and thereby dealing 100 damage to the player, the player's health may decrease by 200 instead of 100. The health indicator 1106b reflects the health of the player in view of the scaled damage taken, while the stamina indicator 1108b reflects the expenditure of stamina, and the magic indicator 1110b reflects the use the magic.

Between the time of challenge game graphics 218b and challenge game graphics 218c, the following events are shown to occur: decrease in proximity from dragon by 100 units, ranged attack on dragon misses, ranged attack on dragon hits, dragon is dealt 200 damage, use of 100 stamina, attack by dragon, and sustaining of 100 damage. Here, if enough time passes in which the player refrains from using magic, the susceptibility of the player to taking damage might be scaled back to normal, as shown in FIG. 12. Thus, when dragon deals 100 damage to the player, the player takes 100 damage, as reflected by health indicator 1106c. Since the player has dealt further damage to the dragon, the progress indicator 1102c is shown to be at about 80%, while the health indicator 1104c for the dragon shows that it is about 80% defeated.

Between the time of challenge game graphics 218c and that of challenge game graphics 218d, the following final sequence of events are shown to occur: use of 200 stamina, increase in proximity to dragon by 200 units, successful melee attack on dragon three times, dealing of 400 damage to the dragon, and defeat of the dragon. As a result of this final sequence of events, the progress indicator 1102d is shown to be filled in all the way, indicating that the player has completed the objective of the game segment. The health indicator 1104d for the dragon is shown also to be filled up all the way, indicating that the dragon's health has been reduced to zero. At this instance, the challenge game is able to detect that the dragon has been defeated by player landongn 1002 via the telemetry and data stream 1200, and, as a result, may terminate the challenge game in order to declare that player landongn 1002 is the victor.

Figure 13:
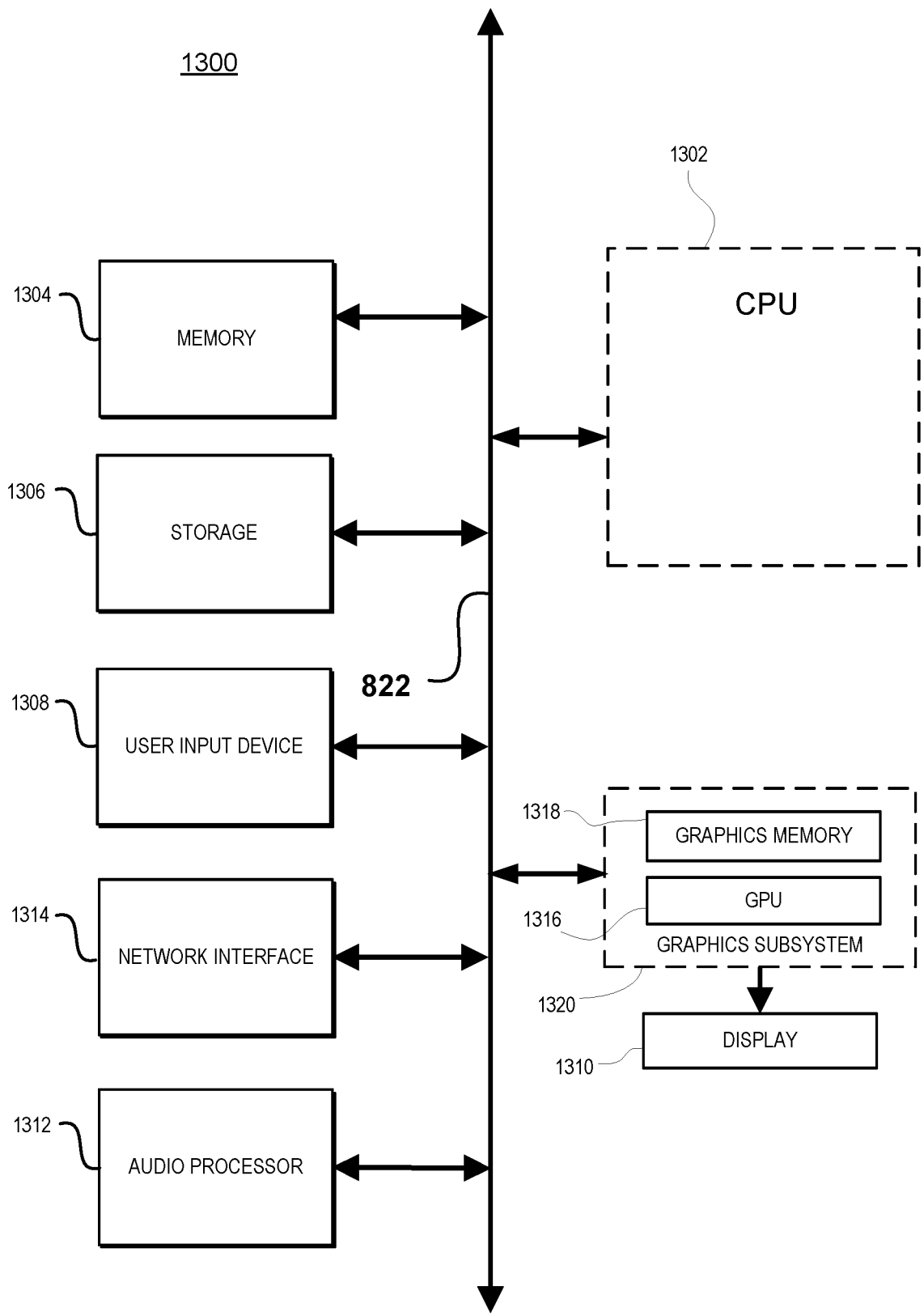
FIG. 13 illustrates components of an example device that can be used to perform aspects of the various embodiments of the present disclosure, such as playing, creating, and viewing challenge games, according to one embodiment.

FIG. 13 illustrates components of an example device 1300 that can be used to perform aspects of the various embodiments of the present disclosure. For example, FIG. 13 illustrates an exemplary hardware system suitable for implementing a device that provides services in support of a user, such as providing a challenge game for play by a player or a spectator interface for viewing the challenge game, in accordance with one embodiment. This block diagram illustrates a device 1300 that can incorporate or can be a personal computer, video game console, personal digital assistant, or other digital device, suitable for practicing an embodiment of the disclosure. Device 1300 includes a central processing unit (CPU) 1302 for running software applications and optionally an operating system. CPU 1302 may be comprised of one or more homogeneous or heterogeneous processing cores. For example, CPU 1302 is one or more general-purpose microprocessors having one or more processing cores. Further embodiments can be implemented using one or more CPUs with microprocessor architectures specifically adapted for highly parallel and computationally intensive applications, such as processing game operations of a challenge game. Device 1300 may be a localized to a player playing a game segment (e.g., game console), or remote from the player (e.g., back-end server processor).

Memory 1304 stores applications and data for use by the CPU 1302. Storage 1306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1308 communicate user inputs from one or more users to device 1300, examples of which may include keyboards, mice, joysticks, touch pads, touch screens, still or video recorders/cameras, tracking devices for recognizing gestures, and/or microphones. Network interface 1314 allows device 1300 to communicate with other computer systems via an electronic communications network, and may include wired or wireless communication over local area networks and wide area networks such as the internet. An audio processor 1312 is adapted to generate analog or digital audio output from instructions and/or data provided by the CPU 1302, memory 1304, and/or storage 1306. The components of device 1300, including CPU 1302, memory 1304, data storage 1306, user input devices 1308, network interface 1310, and audio processor 1312 are connected via one or more data buses 1322.

A graphics subsystem 1320 is further connected with data bus 1322 and the components of the device 1300. The graphics subsystem 1320 includes a graphics processing unit (GPU) 1316 and graphics memory 1318. Graphics memory 1318 includes a display memory (e.g., a frame buffer) used for storing pixel data for each pixel of an output image. Graphics memory 1318 can be integrated in the same device as GPU 1308, connected as a separate device with GPU 1316, and/or implemented within memory 1304. Pixel data can be provided to graphics memory 1318 directly from the CPU 1302. Alternatively, CPU 1302 provides the GPU 1316 with data and/or instructions defining the desired output images, from which the GPU 1316 generates the pixel data of one or more output images. The data and/or instructions defining the desired output images can be stored in memory 1304 and/or graphics memory 1318. In an embodiment, the GPU 1316 includes 3D rendering capabilities for generating pixel data for output images from instructions and data defining the geometry, lighting, shading, texturing, motion, and/or camera parameters for a scene. The GPU 1316 can further include one or more programmable execution units capable of executing shader programs.

The graphics subsystem 1314 periodically outputs pixel data for an image from graphics memory 1318 to be displayed on display device 1310. Display device 1310 can be any device capable of displaying visual information in response to a signal from the device 1300, including CRT, LCD, plasma, and OLED displays. Device 1300 can provide the display device 1310 with an analog or digital signal, for example.

While specific embodiments have been provided to demonstrate the providing challenge games for play and viewing, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A challenge game server (or, simply, game server) may be used by challenge game players, in some embodiments. Most video games played over the Internet operate via a connection to the game server. Typically, games use a dedicated server application that collects data from players and distributes it to other players. Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

Figure 14:
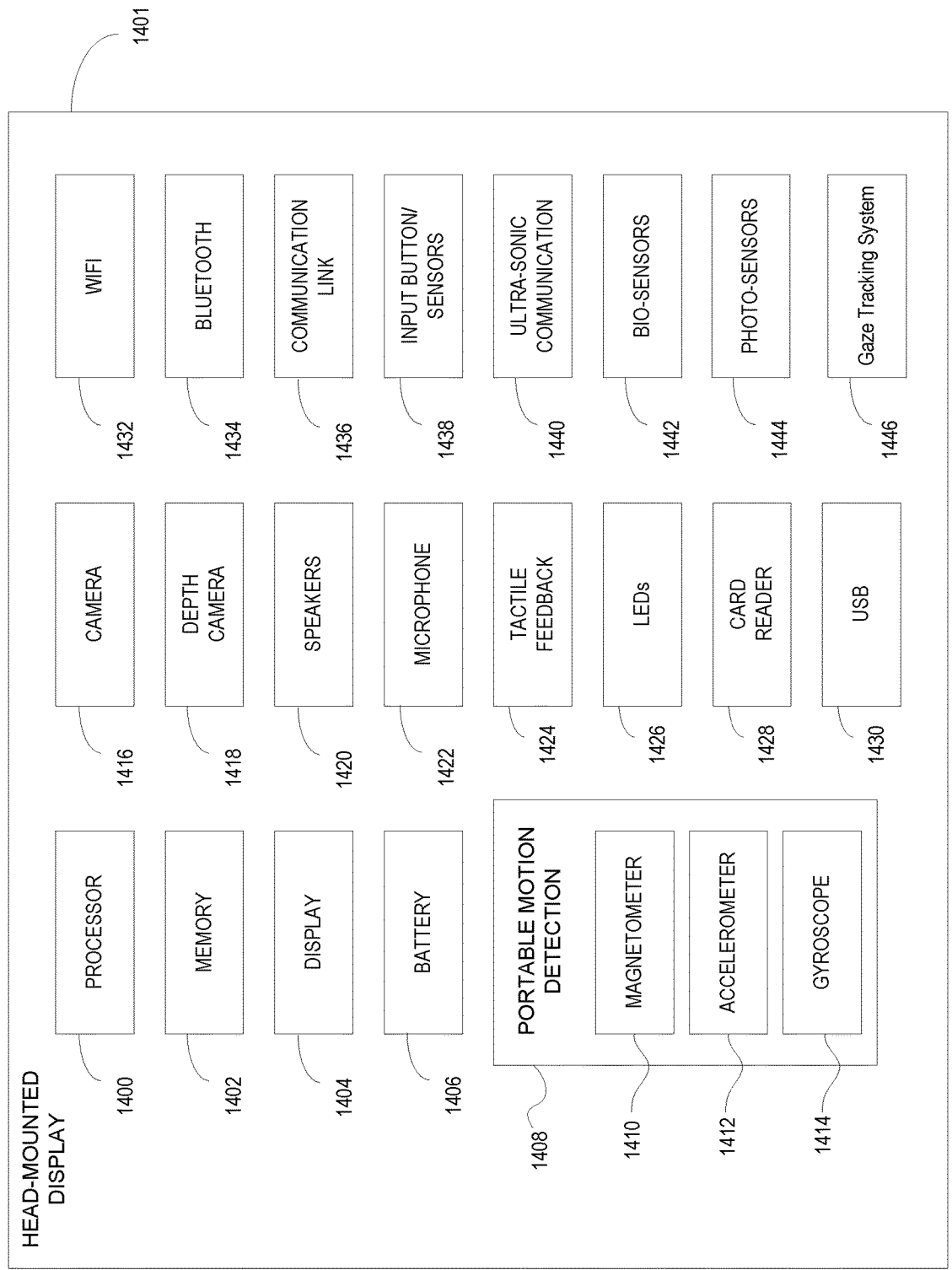
FIG. 14 is a diagram illustrating exemplary components of a head-mounted display, which may be used to perform various aspects of the embodiments provided here, such as playing, creating, and viewing challenge games, according to one embodiment.

It should be understood that the embodiments described herein may be executed on any type of client device. In some embodiments, the client device for one of playing a challenge game, creating a challenge game, or for viewing a challenge game is a head mounted display (HMD). FIG. 14, a diagram illustrating components of a head-mounted display 1401 is shown, in accordance with an embodiment of the disclosure. The HMD 1401 may be configured to display an interface for playing the game segment or for viewing the challenge game as a spectator.

The head-mounted display 1401 includes a processor 1400 for executing program instructions. A memory 1402 is provided for storage purposes, and may include both volatile and non-volatile memory. A display 1404 is included which provides a visual interface that a user may view. A battery 1406 is provided as a power source for the head-mounted display 1401. A motion detection module 1408 may include any of various kinds of motion sensitive hardware, such as a magnetometer 1410, an accelerometer 1412, and a gyroscope 1414.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1412 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1410 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1412 is used together with magnetometer 1410 to obtain the inclination and azimuth of the head-mounted display 1401.

A gyroscope is a device for measuring or maintaining orientation, based on the principles of angular momentum. In one embodiment, three gyroscopes 1414 provide information about movement across the respective axis (x, y and z) based on inertial sensing. The gyroscopes help in detecting fast rotations. However, the gyroscopes can drift over time without the existence of an absolute reference. This requires resetting the gyroscopes periodically, which can be done using other available information, such as positional/orientation determination based on visual tracking of an object, accelerometer, magnetometer, etc.

A camera 1416 is provided for capturing images and image streams of a real environment. More than one camera may be included in the head-mounted display 1401, including a camera that is rear-facing (directed away from a user when the user is viewing the display of the head-mounted display 1401), and a camera that is front-facing (directed towards the user when the user is viewing the display of the head-mounted display 1401). Additionally, a depth camera 1418 may be included in the head-mounted display 1401 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 1401 includes speakers 1420 for providing audio output. Also, a microphone 1422 may be included for capturing audio from the real environment, including sounds from the ambient environment, speech made by the user, etc. The head-mounted display 1401 includes tactile feedback module 1424 for providing tactile feedback to the user. In one embodiment, the tactile feedback module 1424 is capable of causing movement and/or vibration of the head-mounted display 1401 so as to provide tactile feedback to the user.

LEDs 1426 are provided as visual indicators of statuses of the head-mounted display 1401. For example, an LED may indicate battery level, power on, etc. A card reader 1428 is provided to enable the head-mounted display 1401 to read and write information to and from a memory card. A USB interface 1430 is included as one example of an interface for enabling connection of peripheral devices, or connection to other devices, such as other portable devices, computers, etc. In various embodiments of the head-mounted display 1401, any of various kinds of interfaces may be included to enable greater connectivity of the head-mounted display 1401.

A Wi-Fi module 1432 is included for enabling connection to the Internet via wireless networking technologies. Also, the head-mounted display 1401 includes a Bluetooth module 1434 for enabling wireless connection to other devices. A communications link 1436 may also be included for connection to other devices. In one embodiment, the communications link 1436 utilizes infrared transmission for wireless communication. In other embodiments, the communications link 1436 may utilize any of various wireless or wired transmission protocols for communication with other devices.

Input buttons/sensors 1438 are included to provide an input interface for the user. Any of various kinds of input interfaces may be included, such as buttons, touchpad, joystick, trackball, etc. An ultra-sonic communication module 1440 may be included in head-mounted display 1401 for facilitating communication with other devices via ultra-sonic technologies.

Bio-sensors 1442 are included to enable detection of physiological data from a user. In one embodiment, the bio-sensors 1442 include one or more dry electrodes for detecting bio-electric signals of the user through the user's skin.

Photo-sensors 1444 are included to respond to signals from emitters (e.g., infrared base stations) placed in a 3-dimensional physical environment. The gaming console analyzes the information from the photo-sensors 1444 and emitters to determine position and orientation information related to the head-mounted display 1401.

In addition, gaze tracking system 1446 is included and configured to enable tracking of the gaze of the user. For example, system 1446 may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 1401 have been described as merely exemplary components that may be included in head-mounted display 1401. In various embodiments of the disclosure, the head-mounted display 1401 may or may not include some of the various aforementioned components. Embodiments of the head-mounted display 1401 may additionally include other components not presently described, but known in the art, for purposes of facilitating aspects of the present disclosure as herein described.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
   receiving a request to assemble a challenge game between a first player and a second player for a game;
   executing the challenge game for a segment of the game in a spectator interface, the executing of the challenge game includes:
      collecting first telemetry data associated with gameplay of the segment of the game by the first player and second telemetry data associated with gameplay of the segment by the second player,
      processing the first telemetry data and the second telemetry data for generating modified game play metrics,
      replacing game states that were produced when the segment of the game was played by each of the first player and the second player with the modified game play metrics, wherein the modified game play metrics are used to identify progress for the challenge game between the first player and the second player; and
      rendering, based on the modified game play metrics, a graphical element for displaying said progress for the challenge game in the spectator interface.

2. The method of claim 1, wherein the challenge game is associated with a restriction that is used for generating the modified game play metrics.

3. The method of claim 1, wherein the challenge game is defined by an objective and the processing the first telemetry data and the second telemetry data for generating modified game play metrics is based in part on how close the first player and the second player are to achieving the objective.

4. The method of claim 1, wherein the challenge game further defines one or more penalties and wherein the processing the first telemetry data and the second telemetry data further includes:
   filtering the first telemetry data and the second telemetry data to detect that the first player or the second player has performed a game action associated with the one or more penalties; and
   applying the one or more penalties to the first player or the second player during said executing the challenge game, the applying the one or more penalties is indicated on one or more additional graphical elements of the spectator interface.

5. The method of claim 4, wherein the applying the one or more penalties is operable to scale an ability of the first or second player to perform one or more game actions.

6. The method of claim 1, wherein the game is a single-player game and the segment of the game is part of the single-player game, the spectator interface is configured to appear as interactivity of a multiplayer game.

7. The method of claim 1, wherein the segment defines an initialization state and a completion state.

8. The method of claim 7, wherein the initialization state defines a starting point within the game at which the segment begins and the completion state is associated with objectives for the challenge game that defines a set of game states that conclude the segment of the game.

9. The method of claim 1, wherein the first player and the second player play the segment synchronously with respect to one another in a single-player mode while the spectator interface simulates a multiplayer mode.

10. The method of claim 1, wherein the spectator interface provides a side-by-side video showing of the gameplay of the first player and the second player to simulate a multi-player mode.

11. The method of claim 10, wherein the graphical element in the spectator interface includes a first progress bar of the first player and a second progress bar of the second player.

12. The method of claim 10, wherein the graphical element in the spectator interface graphically illustrate the modified game play metrics for each of the first and second players so that a spectator viewing via the spectator interface can view relative progress in the challenge between the first and second players.

13. The method of claim 12, wherein the spectator is provided with access to vote regarding predictions of who between the first and second players will win the challenge game, and said vote and other votes are updated and displayed in the spectator interface based on received votes.

14. The method of claim 1, wherein the request to assemble the challenge game is processed to enable matching of players available for the challenge game, and said request includes generating invites to players to participate in the challenge game.

15. The method of claim 1, further comprising,
   saving a result of the challenge game; and
   enabling replay of the challenge game by one or more other spectators.

* * * * *